US012682293B2

(12) United States Patent
Hiramoto et al.

(10) Patent No.: US 12,682,293 B2
(45) Date of Patent: Jul. 14, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventors: Noriyuki Hiramoto, Tokyo (JP); Kazuyoshi Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/394,191

(22) Filed: Dec. 22, 2023

(65) Prior Publication Data

US 2024/0127132 A1 Apr. 18, 2024

Related U.S. Application Data

(63) Continuation of application No. 16/645,966, filed as application No. PCT/JP2019/031978 on Aug. 14, 2019, now abandoned.

(51) Int. Cl.

| | |
|---|---|
| ***G06V 40/16*** | (2022.01) |
| ***G06F 21/32*** | (2013.01) |
| ***G06Q 10/02*** | (2012.01) |
| ***G07C 9/37*** | (2020.01) |
| ***G07C 9/38*** | (2020.01) |

(52) U.S. Cl.

CPC ............. *G06Q 10/02* (2013.01); *G06F 21/32* (2013.01); *G06V 40/172* (2022.01); *G07C 9/37* (2020.01); *G07C 9/38* (2020.01)

(58) Field of Classification Search

CPC .............. G06Q 10/02; G06Q 10/00–30; G06F 21/00–88

USPC .............................................................. 705/5

See application file for complete search history.

(56) References Cited

U.S. PATENT DOCUMENTS

| | | | | |
|---|---|---|---|---|
| 2001/0016825 A1* | 8/2001 | Pugliese, III | ...... G06Q 20/0457 | 705/5 |
| 2003/0215114 A1* | 11/2003 | Kyle | ...................... G06V 10/94 | 382/115 |
| 2004/0190757 A1* | 9/2004 | Murphy | ................. G07B 15/00 | 340/5.83 |

(Continued)

FOREIGN PATENT DOCUMENTS

| | | |
|---|---|---|
| CN | 104392528 A | 3/2015 |
| CN | 107909683 A | 4/2018 |

(Continued)

OTHER PUBLICATIONS

Chinese Office Action for CN Application No. 201980098888.8 mailed on Aug. 28, 2024 with English Translation.

(Continued)

*Primary Examiner* — Chenyuh Kuo
(74) *Attorney, Agent, or Firm* — Sughrue Mion, PLLC

(57) ABSTRACT

An information processing apparatus in the present invention includes: an acquisition unit that acquires, from a captured image obtained by capturing a passenger who is boarding on an airplane and has not yet passed through a boarding gate corresponding to the airplane, biometric information of the passenger; a specifying unit that specifies boarding reservation information regarding the boarding by using the acquired biometric information; and an output unit that outputs information used for supporting a procedure of the passenger at the boarding gate based on the specified boarding reservation information.

11 Claims, 36 Drawing Sheets

(56) References Cited

U.S. PATENT DOCUMENTS

| | | | | |
|---|---|---|---|---|
| 2005/0128304 | A1 | 6/2005 | Manasseh et al. | |
| 2007/0046426 | A1 | 3/2007 | Ishibashi | G07C 9/257 340/5.82 |
| 2008/0122578 | A1 | 5/2008 | Hoyos | G06V 40/10 340/5.52 |
| 2013/0305059 | A1* | 11/2013 | Gormley | G07F 7/08 713/189 |
| 2016/0117876 | A1 | 4/2016 | Arpin et al. | |
| 2017/0070801 | A1 | 3/2017 | Saito et al. | |
| 2017/0329777 | A1* | 11/2017 | Vlugt | G06F 16/436 |
| 2018/0014382 | A1 | 1/2018 | Glaser | |
| 2018/0373936 | A1 | 12/2018 | Kim | G06V 40/103 3/1 |
| 2019/0012451 | A1 | 1/2019 | Cornick et al. | |
| 2019/0043148 | A1* | 2/2019 | Vemury | G06F 16/22 |
| 2019/0180016 | A1 | 6/2019 | Cornick et al. | |
| 2020/0047346 | A1 | 2/2020 | Yang | B25J 11/008 |

FOREIGN PATENT DOCUMENTS

| | | | |
|---|---|---|---|
| CN | 109102615 | A | 12/2018 |
| CN | 110100261 | A | 8/2019 |
| EP | 3118810 | A1 | 1/2017 |
| JP | 2001-256517 | A | 9/2001 |
| JP | 2006-127322 | A | 5/2006 |
| JP | 2006-164073 | A | 6/2006 |
| JP | 2007-07985 | A | 3/2007 |
| JP | 2007-058763 | A | 3/2007 |
| JP | 2008-225855 | A | 9/2008 |
| JP | 2009-514107 | A | 4/2009 |
| JP | 2014-186650 | A | 10/2014 |
| JP | 2015-102960 | A | 6/2015 |
| JP | 2015-109626 | A | 6/2015 |
| JP | 2015222459 | A | 12/2015 |
| JP | 2016-143338 | A | 8/2016 |
| JP | 2017-078952 | A | 4/2017 |
| JP | 2017-097510 | A | 6/2017 |
| JP | 2018-017924 | A | 2/2018 |
| JP | 2018-061213 | A | 4/2018 |
| JP | 2018-173917 | A | 11/2018 |
| JP | 2019-082450 | A | 5/2019 |
| JP | 2023-054187 | A | 4/2023 |
| WO | 01/63533 | A2 | 8/2001 |
| WO | 2014/148395 | A1 | 9/2014 |
| WO | 2015/136838 | A1 | 9/2015 |
| WO | 2018/116973 | A1 | 6/2018 |

OTHER PUBLICATIONS

SG Office Action for SG Application No. 11202113979R, mailed on Jun. 14, 2024.

Intemational Search Report for PCT/JP2019/031978 dated Nov. 19, 2019 [PCT/ISA/210].

Japanese Office Action for JP Application No. 2021-539773 mailed on Jul. 5, 2022 with English Translation.

Extended European Search Report for EP Application No. EP19941458.2 dated on Jul. 14, 2022.

Japanese Office Action for JP Application No. 2023-025108 mailed on Dec. 12, 2023 with English Translation.

Japanese Office Action for JP Application No. 2024-135516 mailed on May 27, 2025 with English Translation.

JP Office Action for JP Application No. 2024-135516, mailed on Oct. 7, 2025 with English Translation.

U.S. Office Action for U.S. Appl. No. 19/273,286 mailed on Mar. 11, 2026.

* cited by examiner

FIG. 3

| No | ITEM |
| --- | --- |
| 1 | TOKEN ID |
| 2 | GROUP ID |
| 3 | FEATURE AMOUNT |
| 4 | REGISTERED FACE IMAGE |
| 5 | TOKEN ISSUANCE TIME |
| 6 | TOKEN ISSUANCE DEVICE NAME |
| 7 | INVALID FLAG |
| 8 | INVALIDATED TIME |
| 9 | ACCOMPANYING PERSON ID |

FIG. 4

| No | ITEM |
| --- | --- |
| 1 | PASSAGE HISTORY ID |
| 2 | TOKEN ID |
| 3 | PASSAGE TIME |
| 4 | DEVICE NAME |
| 5 | OPERATION SYSTEM TYPE |
| 6 | PASSAGE TOUCH POINT |

FIG. 5

| No | ITEM |
|---|---|
| 1 | TOKEN ID |
| 2 | RESERVATION NUMBER |
| 3 | AIRLINE CODE |
| 4 | OPERATION INFORMATION |

FIG. 6

| No | ITEM |
|---|---|
| 1 | RESERVATION NUMBER |
| 2 | AIRLINE CODE |
| 3 | PASSENGER NAME |
| 4 | DEPARTURE PLACE |
| 5 | DESTINATION PLACE |
| 6 | FLIGHT NUMBER |
| 7 | DATE OF FLIGHT |
| 8 | SEAT NUMBER |
| 9 | SEAT CLASS |
| 10 | NATIONALITY |
| 11 | PASSPORT NUMBER |
| 12 | FAMILY NAME |
| 13 | FIRST NAME |
| 14 | DATE OF BIRTH |
| 15 | SEXUALITY |
| 16 | MEMBERSHIP CATEGORY |
| 17 | WITH OR WITHOUT ACCOMPANYING PERSON |
| 18 | ACCOMPANYING PERSON CATEGORY |

CHECK-IN TERMINAL 20

201 CPU

202 RAM

203 STORAGE DEVICE

207 DISPLAY DEVICE

206 INPUT DEVICE

205

204 COMMUNICATION I/F

209 BIOMETRIC INFORMATION ACQUISITION DEVICE

208 MEDIUM READING DEVICE

AUTOMATIC BAGGAGE DROP-OFF MACHINE 30

301 CPU

302 RAM

303 STORAGE DEVICE

306 INPUT DEVICE

307 DISPLAY DEVICE

305

308 MEDIUM READING DEVICE

309 BIOMETRIC INFORMATION ACQUISITION DEVICE

304 COMMUNICATION I/F

310 BAGGAGE TRANSPORT DEVICE

311 OUTPUT DEVICE

Passenger list screen

| Name | Nationality | Face image | Flight number | Departure place | Destination place | Departure time | Boarding gate |
|------|-------------|------------|---------------|-----------------|-------------------|----------------|---------------|
| AAA aaa | JPN | | AB101 | NRT | LHR | 16:00 | 50 |
| BBB bbb | JPN | | AB101 | NRT | LHR | 16:00 | 50 |
| CCC ccc | JPN | | AB101 | NRT | LHR | 16:00 | 50 |
| DDD ddd | JPN | | AB101 | NRT | LHR | 16:00 | 50 |
| EEE eee | JPN | | AB105 | NRT | FRA | 16:40 | 60 |
| FFF fff | JPN | | AB106 | NRT | MUC | 16:50 | 40 |
| GGG ggg | JPN | | AB101 | NRT | LHR | 16:00 | 50 |
| HHH hhh | JPN | | AB101 | NRT | LHR | 16:00 | 50 |

Operation screen     End

| Extraction condition entry screen |
|---|

Boarding gate     [_____▽]

Flight number     [_____▽]

Priority      ☐ 1    ☐ 2    ☐ 3    ☐ 4

Membership category   ☐ S    ☐ A    ☐ B    ☐ C    ☐ N (Non-member)

Seat class      ☐ First class      ☐ Business class
(Airfare)

☐ Economy class

Token ID      ☐ Yes    ☐ No

[ Extract ]      [ End ]

FIG. 32

Check instruction screen

Captured image

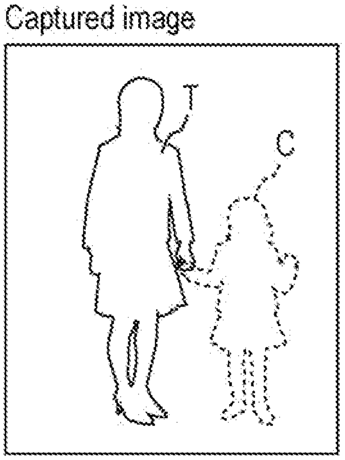

Boarding reservation information

| | |
|---|---|
| Name | MMM mmm |
| Membership category | C |
| Seat class | Economy class |
| Priority | 1 |
| Flight number | AB101 |
| Boarding gate | 50 |
| Departure time | 16 : 00 |
| Accompanying person | Female / Young child |
| * * * | * * * |

Accompanying person information is registered for this passenger.
Please check the accompanying person.

Operation screen | End

FIG. 33

Check instruction screen

Captured image

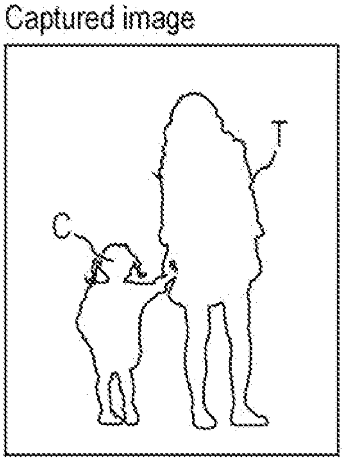

Boarding reservation information

| | |
|---|---|
| Name | NNN nnn |
| Membership category | C |
| Seat class | Economy class |
| Priority | 1 |
| Flight number | AB101 |
| Boarding gate | 50 |
| Departure time | 16:00 |
| Accompanying person | Male / Young child |
| *** | *** |

This accompanying person is different from registered information.
Please check the accompanying person.

Operation screen | End

INFORMATION PROCESSING APPARATUS, INFORMATION PROCESSING METHOD, AND STORAGE MEDIUM

CROSS REFERENCE TO RELATED APPLICATIONS

This application is a Continuation of U.S. application Ser. No. 16/645,966 filed Mar. 10, 2020, which is a National Stage of International Application No. PCT/JP2019/031978 filed Aug. 14, 2019.

TECHNICAL FIELD

The present invention relates to an information processing apparatus, an information processing method, and a storage medium.

BACKGROUND ART

Patent Literature 1 discloses a ticketless boarding system that performs a procedure with face authentication at a plurality of checkpoints (a check-in lobby, a security inspection area, a boarding gate, or the like) by using biometric information (face image) of a passenger.

CITATION LIST

Patent Literature

PTL 1: Japanese Patent Application Laid-Open No. 2007-79656

SUMMARY OF INVENTION

Technical Problem

As illustrated in Patent Literature 1 as an example, it is expected that throughput in an airport is improved by facilitating a use of a terminal having a face authentication function. In the conventional system illustrated as an example in Patent Literature 1, however, for a passenger waiting around a boarding gate, it is not assumed to support a procedure at a boarding gate.

Accordingly, in view of the above problem, the present invention intends to provide an information processing apparatus, an information processing method, and a storage medium that support a procedure of a passenger at a boarding gate.

Solution to Problem

According to one example aspect of the present invention, provided is an information processing apparatus including: an acquisition unit that acquires, from a captured image obtained by capturing a passenger who is boarding on an airplane and has not yet passed through a boarding gate corresponding to the airplane, biometric information of the passenger; a specifying unit that specifies boarding reservation information regarding the boarding by using the acquired biometric information; and an output unit that outputs information used for supporting a procedure of the passenger at the boarding gate based on the specified boarding reservation information.

According to another example aspect of the present invention, provided is an information processing method including steps of: acquiring, from a captured image obtained by capturing a passenger who is boarding on an airplane and has not yet passed through a boarding gate corresponding to the airplane, biometric information of the passenger; specifying boarding reservation information regarding the boarding by using the acquired biometric information; and outputting information used for supporting a procedure of the passenger at the boarding gate based on the specified boarding reservation information.

According to yet another example aspect of the present invention, provided is a storage medium storing a program that causes a computer to perform steps of: acquiring, from a captured image obtained by capturing a passenger who is boarding on an airplane and has not yet passed through a boarding gate corresponding to the airplane, biometric information of the passenger; specifying boarding reservation information regarding the boarding by using the acquired biometric information; and outputting information used for supporting a procedure of the passenger at the boarding gate based on the specified boarding reservation information.

Advantageous Effects of Invention

According to the present invention, an information processing apparatus, an information processing method, and a storage medium that support a procedure of a passenger at a boarding gate can be provided.

BRIEF DESCRIPTION OF DRAWINGS

FIG. 3 is a diagram illustrating one example of information stored in a token ID information database in the first example embodiment.

FIG. 4 is a diagram illustrating one example of information stored in a passage history information database in the first example embodiment.

FIG. 5 is a diagram illustrating one example of information stored in an operation information database in the first example embodiment.

FIG. 6 is a diagram illustrating one example of information stored in a reservation information database in the first example embodiment.

FIG. 32 is a diagram illustrating one example of a check instruction screen of an accompanying person displayed on the operation terminal in the second example embodiment.

FIG. 33 is a diagram illustrating one example of a check instruction screen of an accompanying person displayed on the operation terminal in the second example embodiment.

DESCRIPTION OF EMBODIMENTS

Illustrative example embodiments of the present invention will be described below with reference to the drawings. Throughout the drawings, the same components or corresponding components are labeled with the same references, and the description thereof may be omitted or simplified.

First Example Embodiment

Figure 1:
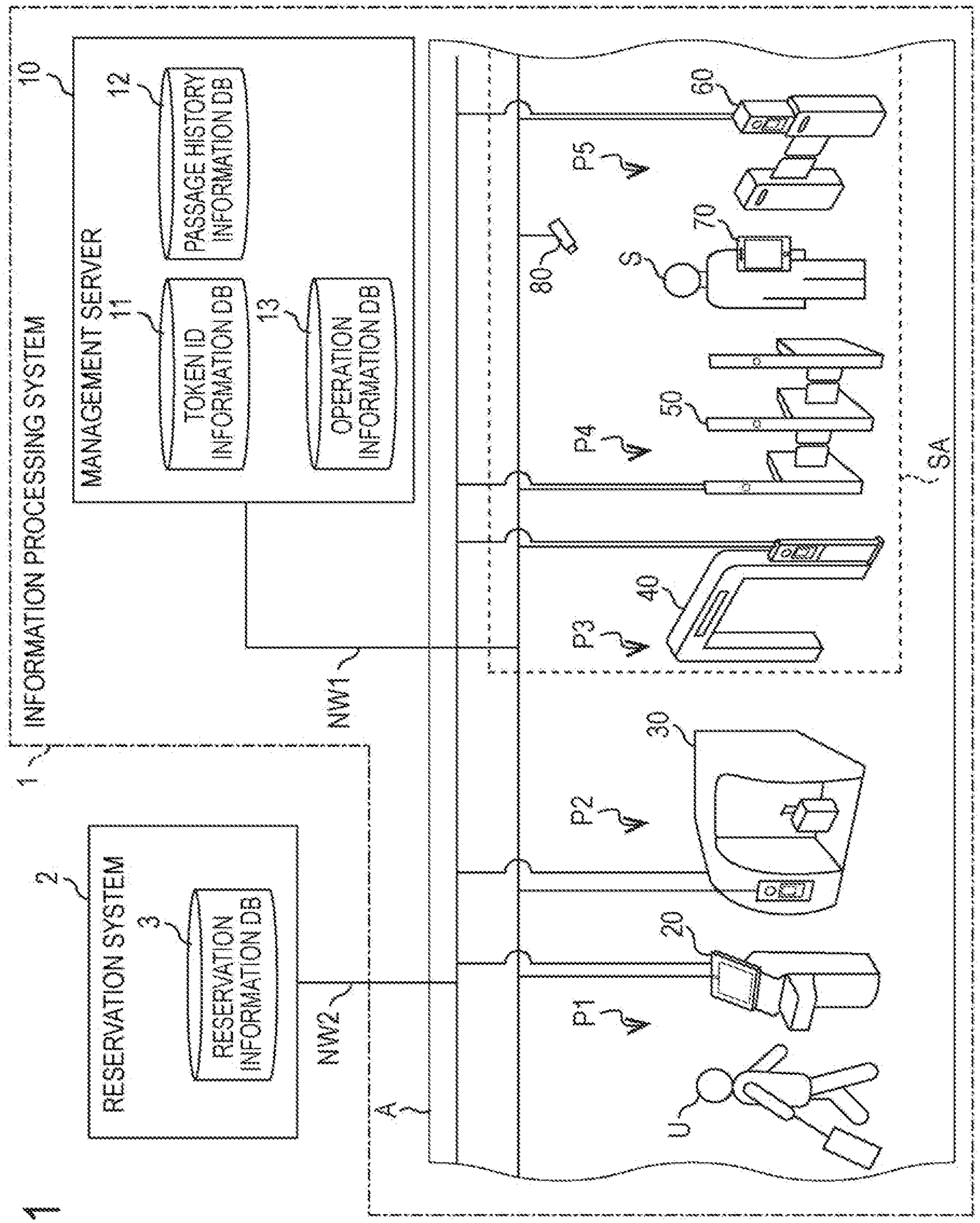
FIG. 1 is a block diagram illustrating an example of an overall configuration of an information processing system in a first example embodiment.

FIG. 1 is a block diagram illustrating an example of the overall configuration of an information processing system 1 in the present example embodiment. The information processing system 1 is a computer system that manages and supports an operation regarding an inspection procedure at immigration to a user (hereafter, referred to as a "passenger") U at an airport A. The information processing system 1 is operated by a public institution such as an office of administration of immigration or a consignee consigned for the operation of the institution, for example. Unlike the information processing system 1, a reservation system 2 is a computer system provided in an airline company. The reservation system 2 includes a reservation information database (DB) 3 that manages boarding reservation information. Note that, although only one reservation system 2 is illustrated for simplified illustration in FIG. 1, the reservation system 2 is provided for each of a plurality of airline companies.

In the information processing system 1 of the present example embodiment, a check-in terminal 20, an automatic baggage drop-off machine 30, a security inspection apparatus 40, an automated gate apparatus 50, and a boarding gate apparatus 60 are connected to a common management server 10 via the network NW1, respectively. The security inspection apparatus 40, the automated gate apparatus 50, and the boarding gate apparatus 60 are installed in a security area SA illustrated by a dashed line. Similarly, in the reservation system 2 of each airline company, the check-in terminal 20, the automatic baggage drop-off machine 30, the security inspection apparatus 40, the automated gate apparatus 50, and the boarding gate apparatus 60 are connected to a server (not illustrated) via the network NW2, respectively. Note that an operation terminal 70 used by a staff member S is connected to the networks NW1 and NW2 via access points (not illustrated).

The networks NW1 and NW2 are formed of a local area network (LAN) including LAN of the airport A, a wide area network (WAN), a mobile communication network, or the like. The connection scheme is not limited to a wired scheme but may be a wireless scheme. The networks NW1 and NW2 are different networks from each other. That is, in the present example embodiment, the information processing system 1 is not directly connected to the reservation system 2.

The management server 10 is provided in a facility of an airport company that runs the airport A, for example. Note that the management server 10 may be a cloud server instead of a server installed in a facility where an operation is actually provided. Further, the management server 10 is not necessarily required to be a single server but may be formed as a server group including a plurality of servers.

As illustrated in FIG. 1, inspection procedures at departure from a country at the airport A are sequentially performed at five touch points. The relationship between each apparatus and each touch point will be described below.

The check-in terminal 20 is installed in a check-in lobby (hereafter, referred to as "touch point P1") in the airport A. The check-in terminal 20 is a self-service terminal by which the user U performs a check-in procedure (boarding procedure) by himself/herself. Upon completion of the procedure at the touch point P1, the user U moves to a baggage counter or a security inspection area.

The automatic baggage drop-off machine 30 is installed at a baggage counter (hereafter, referred to as "touch point P2") in the airport A. The automatic baggage drop-off machine 30 is a self-service terminal which is operated by the user U by himself/herself to perform a procedure of dropping off baggage that is not carried in an airplane (baggage drop-off procedure). Upon completion of the procedure at the touch point P2, the user U moves to a security inspection area. Note that, when the user U does not drop off his/her baggage, the procedure at the touch point P2 is omitted.

The security inspection apparatus 40 is installed in a security inspection area (hereafter, referred to as "touch point P3") in the airport A. The security inspection apparatus 40 is an apparatus that uses a metal detector to check whether or not the user U wears a metal that may be a dangerous object. Note that the term "security inspection apparatus" in the present example embodiment is used as a meaning including an X-ray inspection apparatus that uses an X-ray to check whether or not there is a dangerous object in carry-on baggage or the like, a terminal apparatus of a passenger reconciliation system (PRS) that determines whether or not to permit passage of the user U at the entrance of a security inspection area, or the like without being limited to a metal detector. The user U who completes a check-in procedure or an automatic baggage drop-off procedure goes through a security inspection procedure by the security inspection apparatus 40 in the security inspection area. Upon completion of the procedure at the touch point P3, the user U moves to an immigration area.

The automated gate apparatus 50 is installed in an immigration area (hereafter, referred to as "touch point P4") in the airport A. The automated gate apparatus 50 is an apparatus that automatically performs an immigration procedure of the user U. Upon completion of the procedure at the touch point P4, the user U moves to a departure area in which a duty-free shop and a boarding gate are provided.

The boarding gate apparatus 60 is a passage control apparatus installed for each boarding gate (hereafter, referred to as "touch point P5") in the departure area. The boarding gate apparatus 60 confirms that the user U is a passenger of an airplane who is allowed to board via the boarding gate. Upon completion of the procedure at the touch point P5, the user U boards on the airplane and departs from the country.

The operation terminal 70 is a terminal apparatus used by the staff member S for its operation. One example of the operation terminal 70 may be a personal computer, a tablet terminal, a smartphone, or the like but not limited thereto. The operation terminal 70 receives information transmitted from the management server 10 and displays the information on a screen. The management server 10 of the present example embodiment transmits information used for supporting a procedure performed by a passenger at a boarding gate to the operation terminal 70. Details of the information will be described later.

A plurality of cameras 80 are arranged in peripheral regions (adjacent regions) of boarding gates and are image capture devices that capture peripheral regions of the boarding gates, respectively. Each camera 80 is attached to a ceiling, a wall, a pillar, or the like, for example, so as to be able to capture a face of the user U who is present in the peripheral region of the boarding gate and waiting for boarding. The type of the camera 80 may be any of a fixed type and a movable type.

Figure 2:
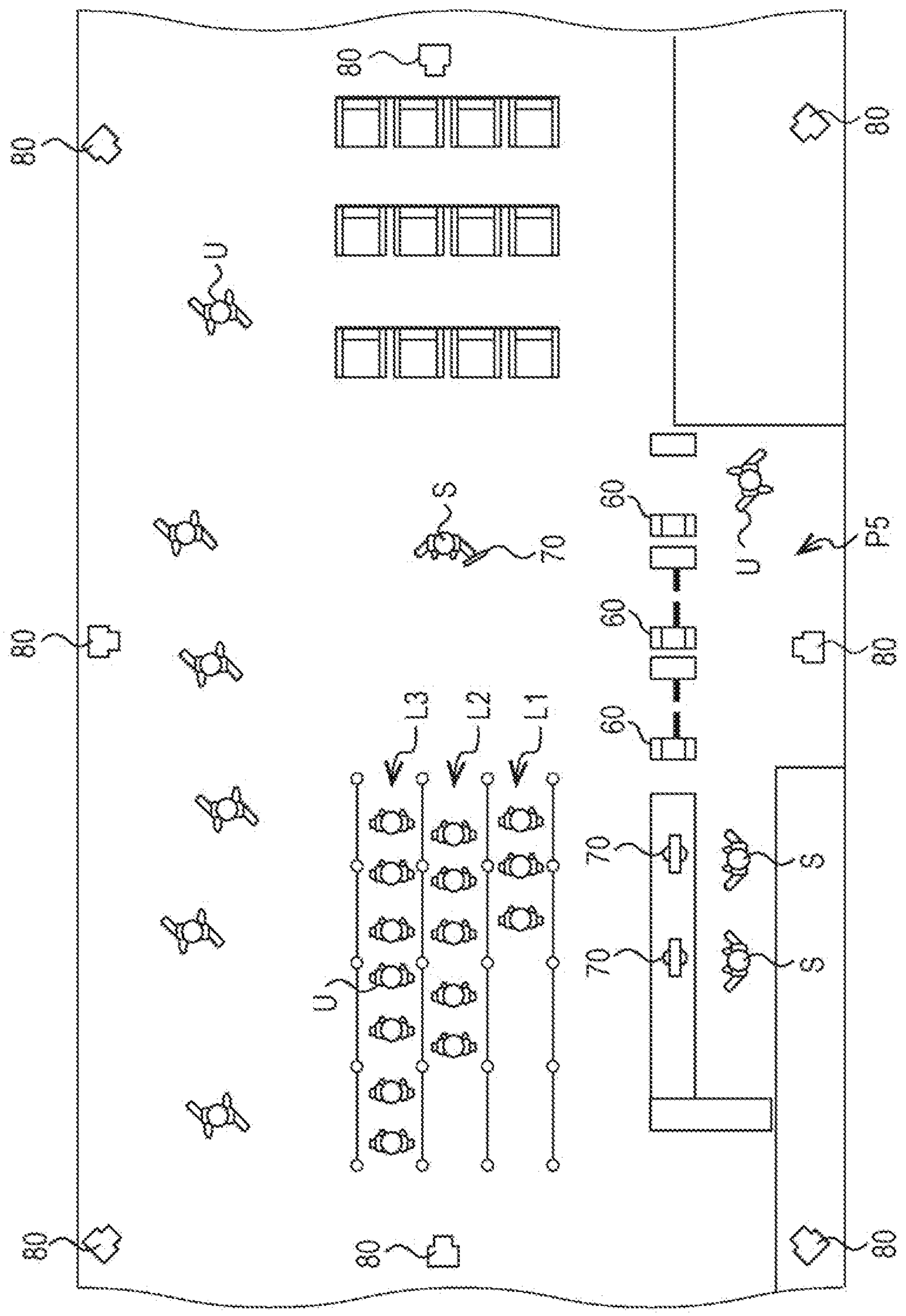
FIG. 2 is a diagram illustrating one example of the arrangement of boarding gate apparatuses, operation terminals, and cameras in the first example embodiment.

FIG. 2 is a diagram illustrating one example of the arrangement of the boarding gate apparatuses 60, the operation terminals 70, and the cameras 80. This example illustrates a case where the plurality of cameras 80 are installed in the peripheral region of the boarding gate and capture passengers at various capturing angles. It is preferable that each operation terminal 70 can selectively switch captured images captured by the plurality of cameras 80 on an operation screen. Further, two types of mobile type and fixed type are illustrated as the operation terminal 70 used by the staff member S. Further, L1 to L3 each represent a waiting area (waiting lane) as an example where the users U wait in a line before boarding.

In general, an airline company categorizes the users U into a plurality of groups in advance based on various conditions such as a seat class, a membership category, accompanying person information, a seat position, or the like and guides the users U to the boarding gate in predetermined group order. For example, a passenger accompanying an infant or a young child, a passenger whose seat class is the first class, a passenger recognized as an upper class member by the airline company, or the like is categorized into a group having relatively higher priority in boarding guide. The group having high priority is to receive a priority boarding service.

Further, as illustrated in FIG. 1, the management server 10 has a token ID information DB 11, a passage history information DB 12, and an operation information DB 13. Note that the database included in the management server 10 is not limited to these databases.

FIG. 3 is a diagram illustrating one example of information stored in the token ID information DB 11. The token ID information DB 11 has data items of "token ID", "group ID", "feature amount", "registered face image", "token issuance time", "token issuance device name", "invalid flag", "invalidated time", and "accompanying person ID". The token ID is an identifier that uniquely identifies ID information. In the present example embodiment, the token ID is temporarily issued provided that there is a matching in a matching result between a passport face image read from a passport at the touch point P1 and a face image obtained by capturing the user U having the passport. Then, when the user U finishes a procedure at the touch point P5 (boarding gate), the token ID is invalidated. That is, the token ID is a onetime ID having a lifetime.

The group ID is an identifier used for grouping ID information. The feature amount is a value extracted from biometric information. For example, the same group ID is set for the user U having an accompanying person or the users U of a party traveler. The registered face image is a face image registered for the user U. The term of biometric information in the present example embodiment means a face image and a feature amount extracted from the face image. Note that the biometric information is not limited to a face image and a face feature amount. That is, a fingerprint image, a palm-print image, a pinna image, an iris image, or the like may be used as the biometric information of the user U to perform biometric authentication.

The token issuance time is the time when the management server 10 issues a token ID. The token issuance device name is a name of a device from which a registered face image that triggers issuance of a token ID is acquired. The invalid flag is flag information indicating whether or not the token ID is currently valid. Once a token ID is issued, the invalid flag becomes a value of "1" indicating that the token ID is valid. Further, once a predetermined condition is satisfied, the invalid flag is updated to a value of "0" indicating that the token ID is invalid. The invalidated time is a timestamp when the invalid flag is disabled.

The accompanying person ID is a token ID issued for a person who boards on an airplane with support from another passenger, for example, a person such as an infant, a young child, or the like (hereafter, referred to as "supported person"). A person associated with the accompanying person ID is a supporting side person such as a guardian, for example, a father or a mother or a helper (hereafter, referred to as "supporting person"). The accompanying person ID is issued to a supported person at the same time when a supporting person first performs a procedure, for example. In the present example embodiment, a case where a single supported person is associated with a single supporting person will be described. However, a plurality of supported persons may be associated with a single supporting person.

FIG. 4 is a diagram illustrating one example of information stored in the passage history information DB 12. The passage history information DB 12 has data items of "passage history ID", "token ID", "passage time", "device name", "operation system type", and "passage touch point". The passage history ID is an identifier that uniquely identifies passage history information. The passage time is a timestamp when a passenger passes through the touch points P1 to P5. The device name is a machine name of a terminal used in procedures at the touch points P1 to P5. The operation system type is a type of the operation system to which a terminal belongs. The passage touch point is each name of the touch points P1 to P5 that a passenger has passed through. Note that the management server 10 can extract the passage history information on a token ID basis to recognize up to which touch point the user U completed the procedure.

FIG. 5 is a diagram illustrating one example of information stored in the operation information DB 13. The operation information DB 13 has data items of "token ID", "reservation number", "airline code", and "operation information". The reservation number is an identifier that uniquely identifies reservation information of boarding to an airplane. The airline code is an identifier that uniquely identifies an airline company. The operation information is arbitrary information obtained by an operation at each touch point.

FIG. 6 is a diagram illustrating one example of information stored in the reservation information DB 3. The reservation information DB 3 has data items of "reservation number", "airline code", "passenger name", "departure place", "destination place", "flight number", "date of flight", "seat number", "seat class" (for example, first class/business class/economy class), "nationality", "passport number", "family name", "first name", "date of birth", "sexuality", "membership category", "with or without accompanying person", and "accompanying person category".

In the present example embodiment, the operation information DB 13 and the reservation information DB 3 are associated with each other by a reservation number and an airline code. Specifically, once a terminal apparatus at each touch point (the check-in terminal 20 or the like) reads a reservation number and an airline code from an airline ticket medium presented by a passenger, the terminal apparatus can inquire boarding reservation information from the reservation system 2 of an airline company corresponding to an airline code based on the reservation number. Note that a method of inquiring boarding reservation information from the reservation system 2 is not limited thereto.

Next, with reference to FIG. 7 to FIG. 13, an example of a hardware configuration of each apparatus forming the information processing system 1 will be described. Note that, since devices having the same name but having different references in FIG. 7 to FIG. 13 are devices having a similar function, detailed description thereof will be omitted in the subsequent drawings.

Figure 7:
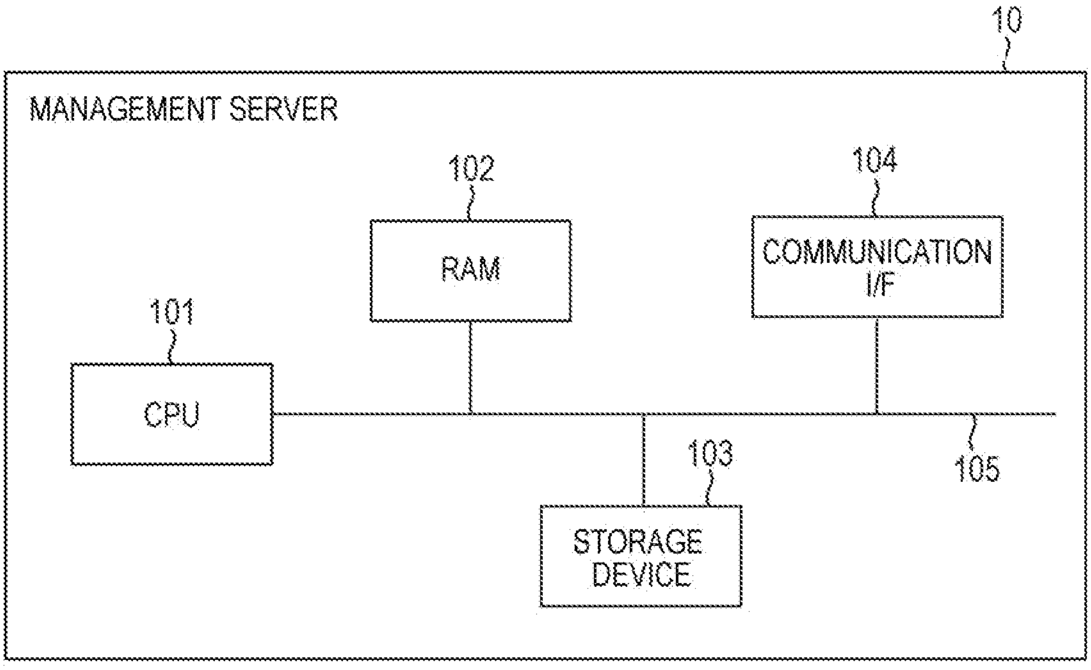
FIG. 7 is a block diagram illustrating one example of a hardware configuration of a management server in the first example embodiment.

FIG. 7 is a block diagram illustrating one example of a hardware configuration of the management server 10. As illustrated in FIG. 7, the management server 10 has a central processing unit (CPU) 101, a random access memory (RAM) 102, a storage device 103, and a communication I/F 104. Each device is connected to a bus line 105.

The CPU 101 is a processor that has a function of performing a predetermined operation in accordance with a program stored in the storage device 103 and controlling each component of the management server 10. The RAM 102 is formed of a volatile storage medium and provides a temporary memory area required for the operation of the CPU 101.

The storage device 103 is formed of a storage medium such as a nonvolatile memory, a hard disk drive, or the like and functions as a storage unit. The storage device 103 stores a program executed by the CPU 101, data referenced by the CPU 101 when the program is executed, or the like.

The communication I/F 104 is a communication interface based on a standard such as Ethernet (registered trademark), Wi-Fi (registered trademark), 4G, or the like, which is a module used for communicating with the check-in terminal 20 or the like.

Figure 8:
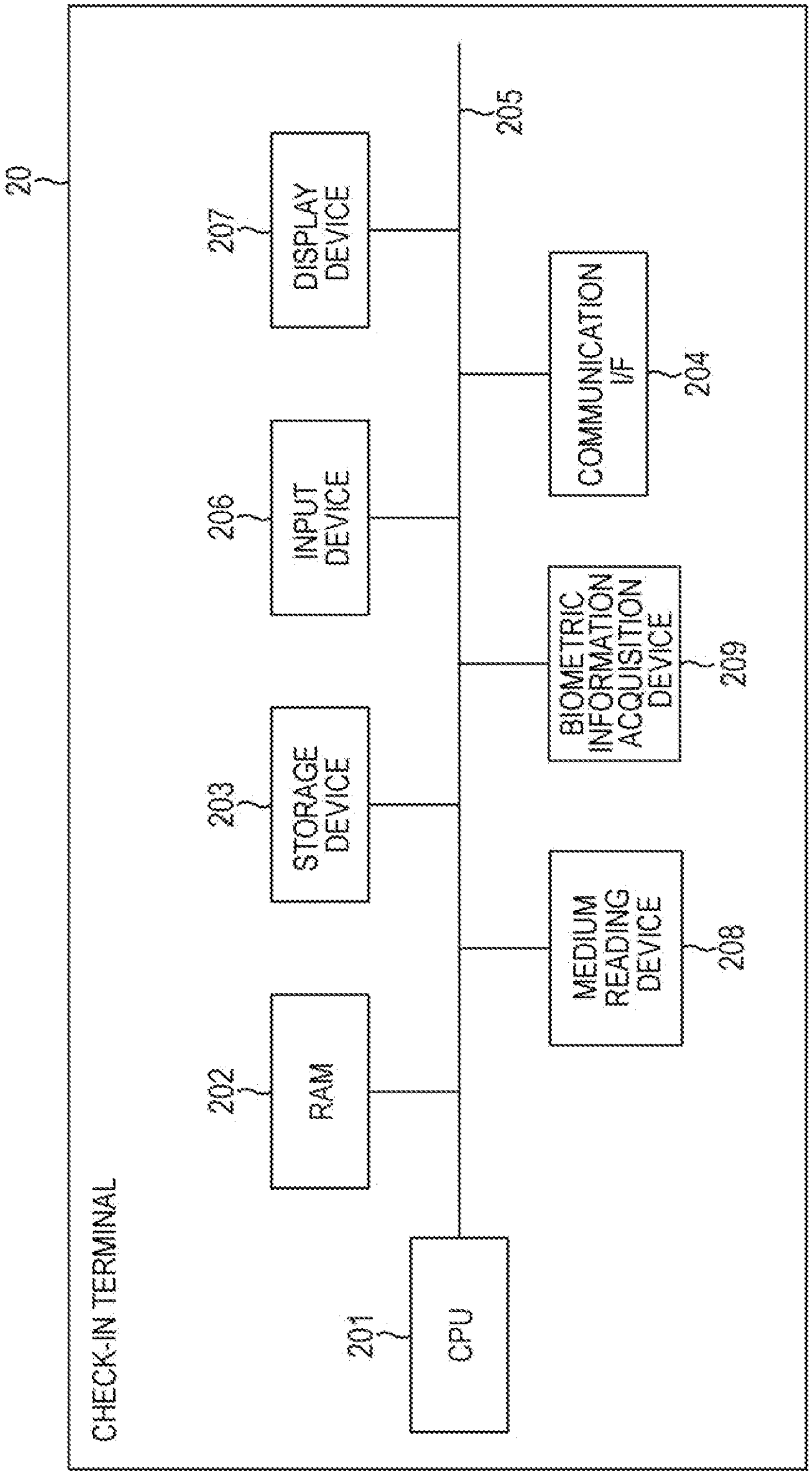
FIG. 8 is a block diagram illustrating one example of a hardware configuration of a check-in terminal in the first example embodiment.

FIG. 8 is a block diagram illustrating one example of a hardware configuration of the check-in terminal 20. As illustrated in FIG. 8, the check-in terminal 20 has a CPU 201, a RAM 202, a storage device 203, a communication I/F 204, an input device 206, a display device 207, a medium reading device 208, and a biometric information acquisition device 209. Each device is connected to a bus line 205.

The input device 206 is a pointing device such as a touch panel, a keyboard, or the like, for example. The display device 207 is a liquid crystal display device, an organic light emitting diode (OLED) display device, or the like and used for display of a moving image, a static image, a text, or the like. In the check-in terminal 20 of the present example embodiment, the input device 206 and the display device 207 are integrally formed as a touch panel.

The medium reading device 208 is a device that reads a passport or an airline ticket medium of the user U and acquires information recorded on the passport or the airline ticket. The airline ticket medium may be, for example, a paper airline ticket, a mobile terminal that displays a duplicate of an e-ticket, or the like. The medium reading device 208 is formed of a code reader, an image scanner, a contactless integrated circuit (IC) reader, an optical character reader (OCR) device, or the like, for example, and acquires information from various media held over the reading unit thereof.

The biometric information acquisition device 209 is a device that acquires a face image of the user U as biometric information of the user U. For example, the biometric information acquisition device 209 is a digital camera that captures a face of the user U standing in front of the check-in terminal 20, and the biometric information acquisition device 209 captures a face of the user U and acquires a face image.

Figure 9:
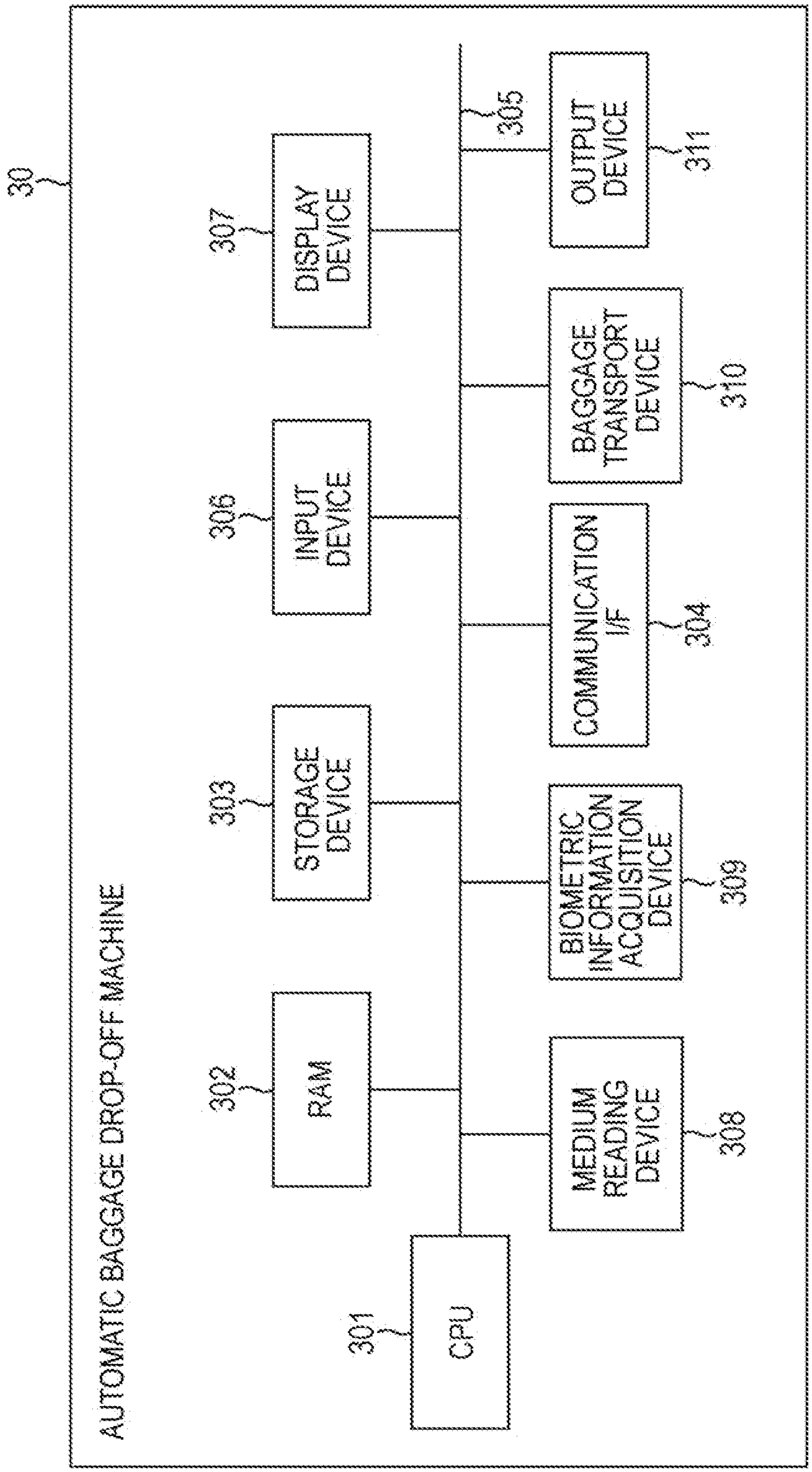
FIG. 9 is a block diagram illustrating one example of a hardware configuration of an automatic baggage drop-off machine in the first example embodiment.

FIG. 9 is a block diagram illustrating one example of a hardware configuration of the automatic baggage drop-off machine 30. As illustrated in FIG. 9, the automatic baggage drop-off machine 30 has a CPU 301, a RAM 302, a storage device 303, a communication I/F 304, an input device 306, a display device 307, a medium reading device 308, a biometric information acquisition device 309, a baggage transport device 310, and an output device 311. Each device is connected to a bus line 305.

The baggage transport device 310 transports baggage of the user U in order to load the baggage to an airplane that the user U is boarding on when the identity verification of the user U is successful. The baggage transport device 310 transports baggage that is placed on a reception part by the user U and attached with a baggage tag to a cargo handling section.

The output device 311 is a device that outputs a baggage tag to be attached to dropped-off baggage. Further, the output device 311 outputs a baggage claim tag required for claiming baggage after arriving at the destination. Note that a baggage tag or a baggage claim tag is associated with at least one of passport information and boarding information.

Figure 10:
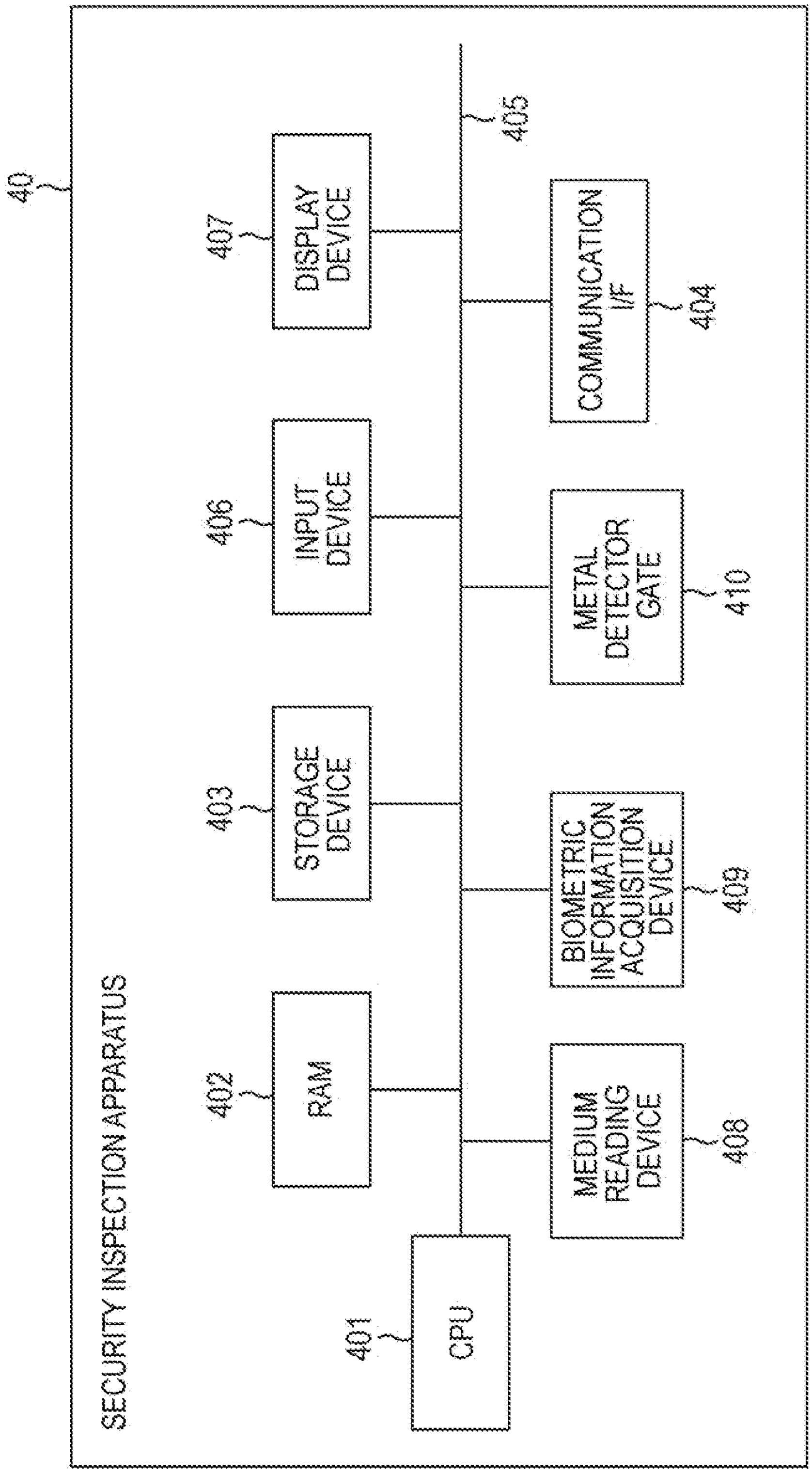
FIG. 10 is a block diagram illustrating one example of a hardware configuration of a security inspection apparatus in the first example embodiment.

FIG. 10 is a block diagram illustrating one example of a hardware configuration of the security inspection apparatus 40. As illustrated in FIG. 10, the security inspection apparatus 40 has a CPU 401, a RAM 402, a storage device 403, a communication I/F 404, an input device 406, a display device 407, a medium reading device 408, a biometric information acquisition device 409, and a metal detector gate 410. Each device is connected to a bus line 405.

The metal detector gate 410 is a gate type metal detector and detects a metal worn by the user U passing through the metal detector gate 410.

Figure 11:
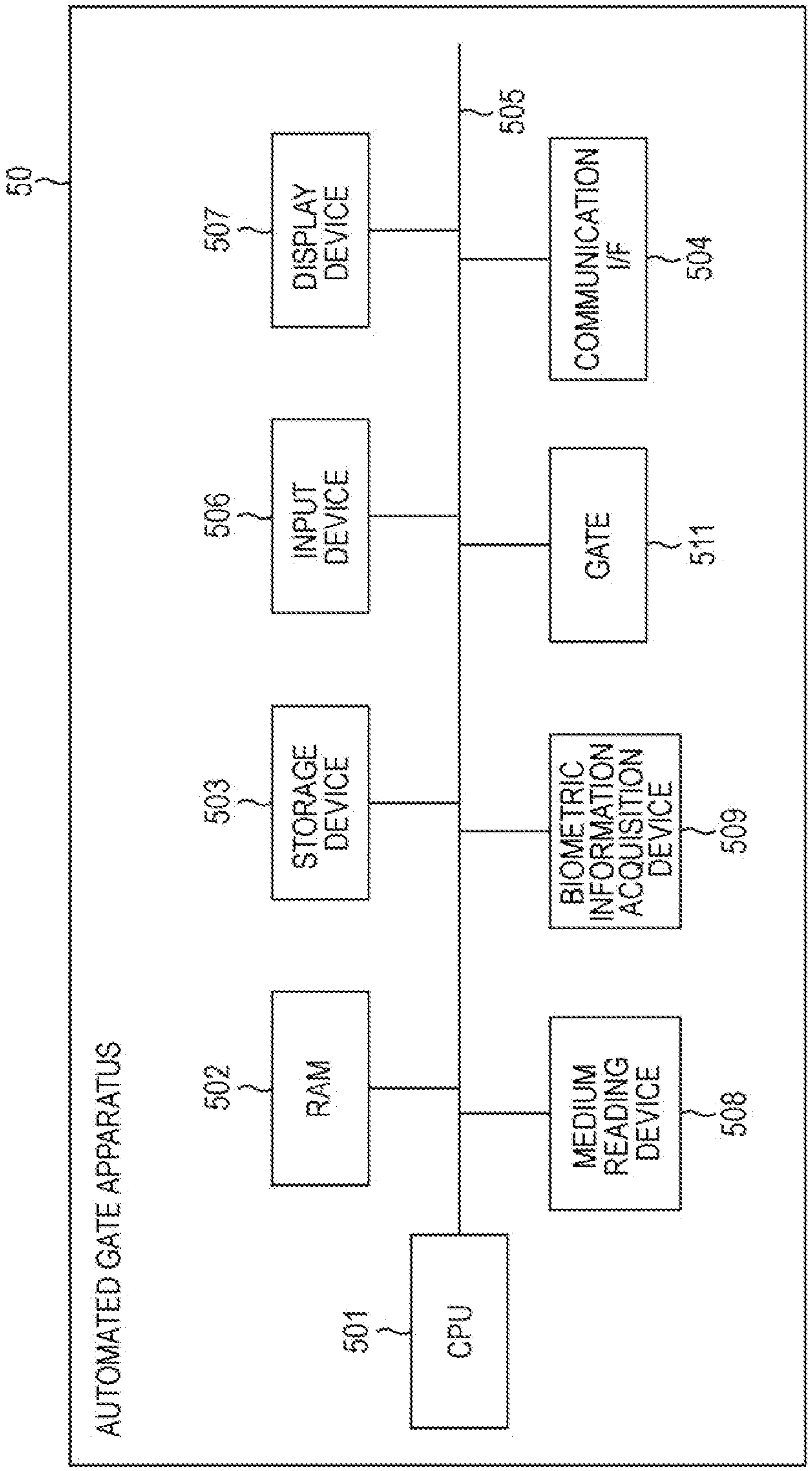
FIG. 11 is a block diagram illustrating one example of a hardware configuration of an automated gate apparatus in the first example embodiment.

FIG. 11 is a block diagram illustrating one example of a hardware configuration of the automated gate apparatus 50. The automated gate apparatus 50 has a CPU 501, a RAM 502, a storage device 503, a communication I/F 504, an input device 506, a display device 507, a medium reading device 508, a biometric information acquisition device 509, and a gate 511. Each device is connected to a bus line 505. Note that the automated gate apparatus 50 is arranged in the entry inspection site has the same hardware as the automated gate apparatus 50 arranged in the immigration area.

The gate 511 transitions from a closed state to block passage of the user U during standby to an opened state to permit passage of the user U under the control of the CPU 501 when identity verification of the user U at the automated gate apparatus 50 is successful and the user U passes through immigration procedure. The scheme of the gate 511 is not particularly limited and may be, for example, a flapper gate whose flapper provided on one side of the pathway or flappers provided on both sides of the pathway are opened and closed, a turn style gate whose three bars rotate, or the like.

Figure 12:
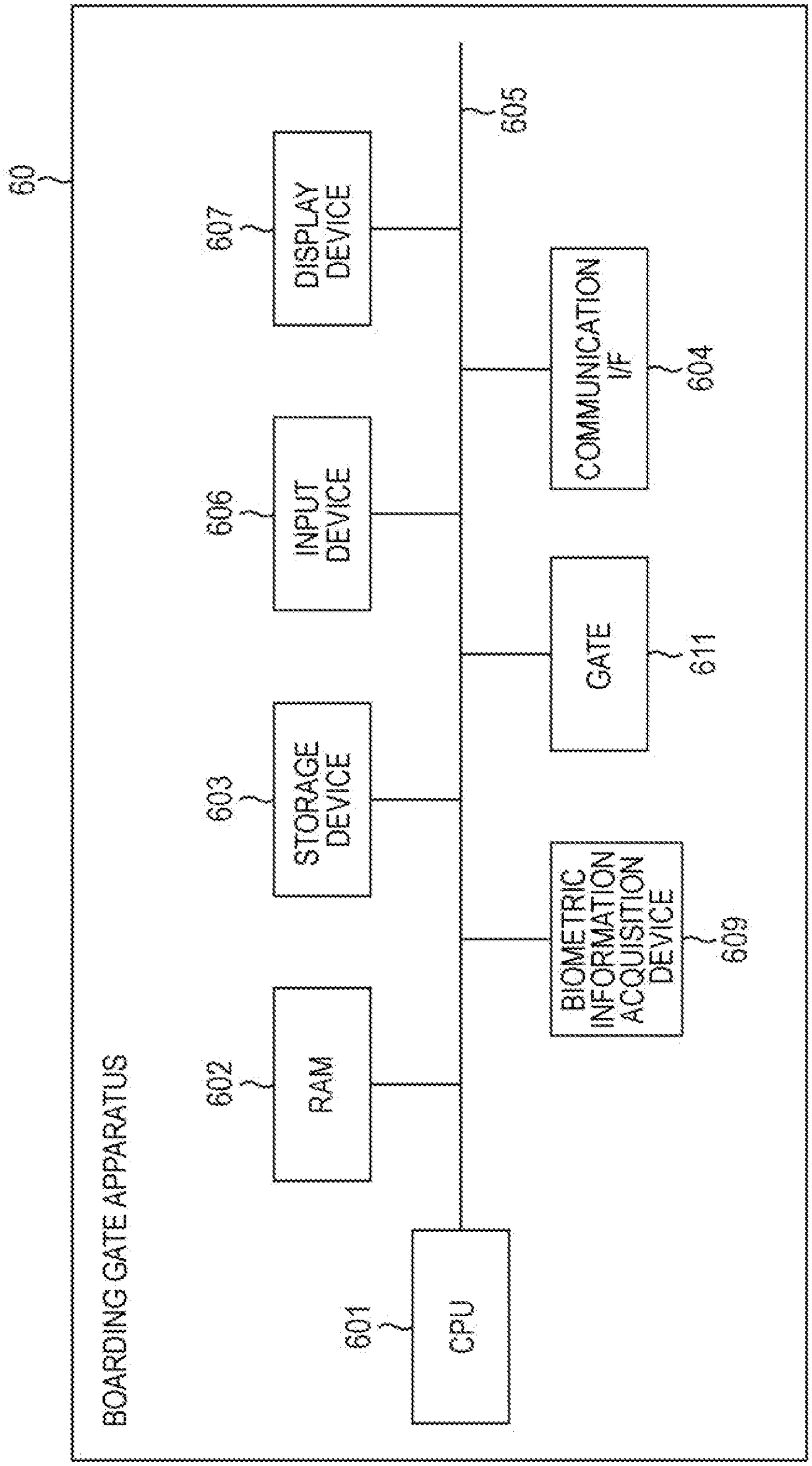
FIG. 12 is a block diagram illustrating one example of a hardware configuration of a boarding gate apparatus in the first example embodiment.

FIG. 12 is a block diagram illustrating one example of a hardware configuration of the boarding gate apparatus 60. As illustrated in FIG. 12, the boarding gate apparatus 60 has a CPU 601, a RAM 602, a storage device 603, a communication I/F 604, an input device 606, a display device 607, a biometric information acquisition device 609, and a gate 611. Each device is connected to a bus line 605.

Figure 13:
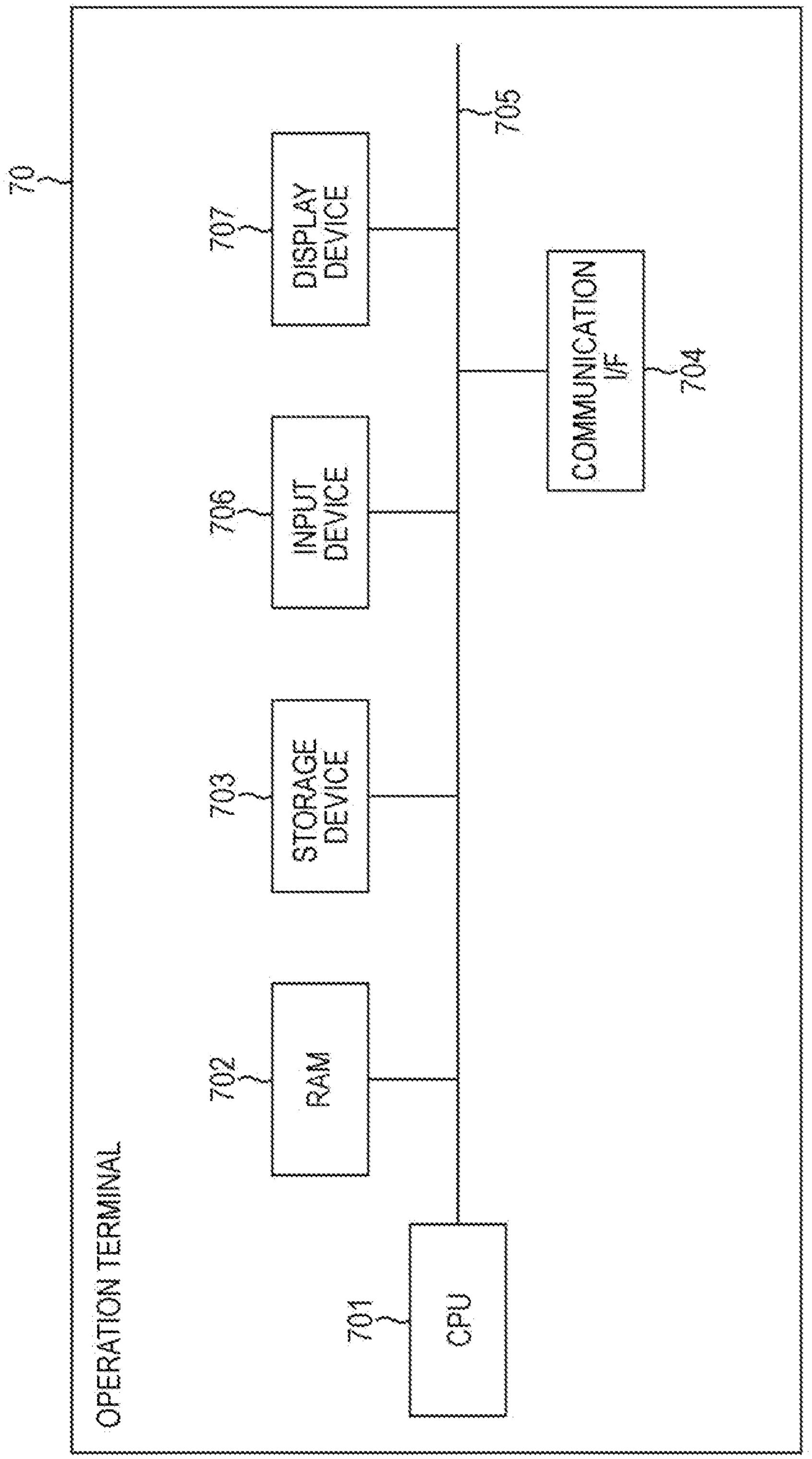
FIG. 13 is a block diagram illustrating one example of a hardware configuration of an operation terminal in the first example embodiment.

FIG. 13 is a block diagram illustrating one example of a hardware configuration of the operation terminal 70. As illustrated in FIG. 13, the operation terminal 70 has a CPU 701, a RAM 702, a storage device 703, a communication I/F 704, an input device 706, and a display device 707. Each device is connected to a bus line 705.

Next, the operation of each apparatus in the information processing system 1 in the present example embodiment will be described based on FIG. 14 to FIG. 30.

[Check-in Procedure]

Figure 14:
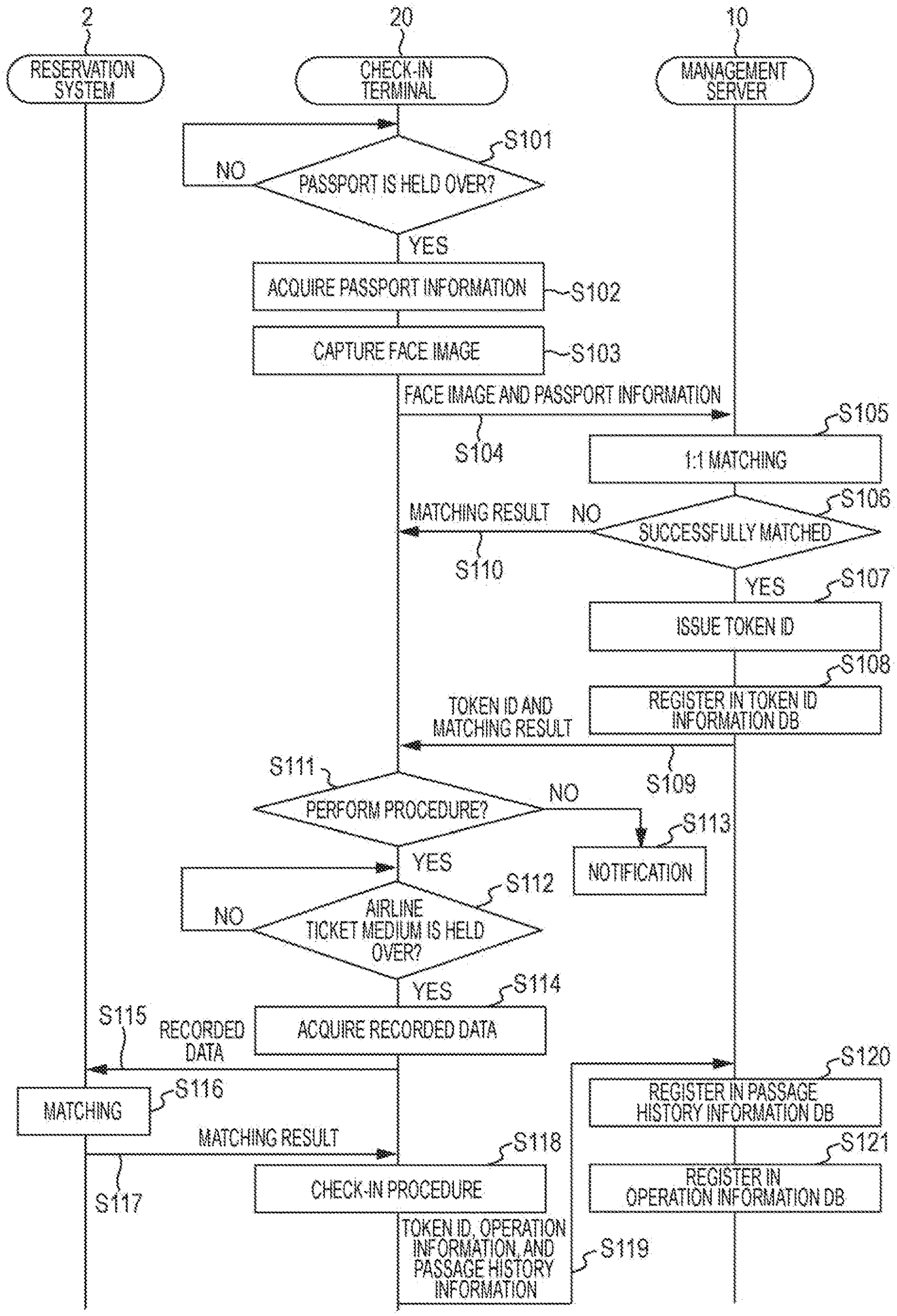
FIG. 14 is a sequence diagram illustrating one example of the process in the reservation system, the check-in terminal, and the management server in the first example embodiment.

FIG. 14 is a sequence diagram illustrating one example of the process in the reservation system 2, the check-in terminal 20, and the management server 10. This process is performed when the user U uses the check-in terminal 20 to perform a check-in procedure.

First, the check-in terminal 20 determines whether or not a passport of the user U is held over a reading unit (not illustrated) of the medium reading device 208 (step S101), and stands by until a passport is held over (step S101, NO).

Next, if it is determined that a passport is held over the reading unit of the medium reading device 208 (step S101, YES), the check-in terminal 20 acquires passport information on the user U from the passport that is held over (step S102). The acquired passport information includes a passport face image of the user U, identity verification information, a passport number, information on a passport issuance country, or the like.

Next, the check-in terminal 20 captures a face of the user U by using the biometric information acquisition device 209 (step S103) and transmits the face image and the passport information to the management server 10 (step S104). Note that it is preferable to display a screen used for obtaining consent of the user U before capturing a face image.

In response to receiving information from the check-in terminal 20, the management server 10 matches, at 1:1, a face image recorded on the passport of the user U (hereafter, referred to as "passport face image") with a face image captured by the check-in terminal 20 (hereafter, referred to as "target face image") (step S105).

Next, if it is determined that the matching result between the passport face image and the target face image indicates a successful matching (step S106, YES), the management server 10 issues a token ID (step S107). The token ID is set to a unique value based on date and time or a sequence number at a process, for example.

Next, the management server 10 uses the target face image as a registered face image and registers a relationship between the token ID and the registered face image in the token ID information DB 11 (step S108).

In the present example embodiment, the reason why a face image captured on site (target face image) is used as the registered face image is that the lifecycle of a token ID is terminated within the day, that a captured image is closer to an image captured in the subsequent authentication process than a passport face image in a quality (appearance), or the like. However, a passport face image may be set as a registered face image (registered biometric information)

instead of a target face image (captured face image). For example, when a lifecycle of a token ID spans a long term (for example, when a token ID is validated for a certain lifecycle if the user U has a membership, or the like in airline services), a face image of a passport or a license card may be set as a registered face image.

Next, the management server 10 transmits the issued token ID and a matching result of a successful matching to the check-in terminal 20 (step S109).

On the other hand, if it is determined the matching result between the passport face image and the target face image indicates an unsuccessful matching (step S106, NO), the management server 10 transmits the matching result of the unsuccessful matching to the check-in terminal 20 (step S110).

Next, based on the matching result of the successful matching received from the management server 10, if the check-in terminal 20 determines that the check-in procedure can be performed (step S111, YES), the process proceeds to step S112. Contrarily, based on the matching result of the unsuccessful matching received from the management server 10, if the check-in terminal 20 determines that the check-in procedure is not performed (step S111, NO), the check-in terminal 20 notifies the user U of an error message (step S113).

In step S112, the check-in terminal 20 determines whether or not an airline ticket medium of the user U is held over the reading unit of the medium reading device 208. The check-in terminal 20 stands by until an airline ticket medium is held over (step S112, NO).

Next, if it is determined that an airline ticket medium is held over the reading unit of the medium reading device 208 (step S112, YES), the check-in terminal 20 acquires recorded data such as a reservation number, an airline code, and the like from the airline ticket medium that is held over (step S114).

Next, the check-in terminal 20 transmits the recorded data to the reservation system 2 of an airline company corresponding to the airline code (step S115) and requests matching between the recorded data and boarding reservation information.

In response to receiving recorded data from the check-in terminal 20, the reservation system 2 matches the recorded data with boarding reservation information stored in the reservation information DB 3 (step S116) and transmits the matching result to the check-in terminal 20 (step S117).

Next, in response to receiving the matching result of a successful matching from the reservation system 2, the check-in terminal 20 performs a check-in procedure such as confirmation of an itinerary, selection of a seat, or the like based on the input information on the user U (step S118). If there is no matching in the matching result in the reservation system 2, the check-in terminal 20 may notify the user U of an error without performing a check-in procedure. The check-in terminal 20 then transmits, to the management server 10, a token ID, operation information, and passage history information indicating completion of procedure at the check-in terminal 20 (step S119). Note that the operation information includes at least a reservation number and an airline code. Further, the passage history information includes information such as a passage time at the touch point P1, a device name of a terminal used for the procedure, or the like.

Next, in response to receiving information from the check-in terminal 20, the management server 10 registers passage history information indicating a relationship between the token ID and the passage information at the touch point P1 in the passage history information DB 12 (step S120). The management server 10 then registers the operation information received from the check-in terminal 20 in the operation information DB 13 if necessary (step S121).

As described above, a target face image (captured face image) successfully matched with a passport face image acquired from a passport in a check-in procedure is registered in the token ID information DB 11 as a registered face image, and a registered face image and operation information in the operation information DB 13 are associated with each other by the issued token ID. This enables biometric authentication by using face matching between a captured face image and a registered face image at each subsequent touch point.

[Baggage Drop-Off Procedure]

Figure 15:
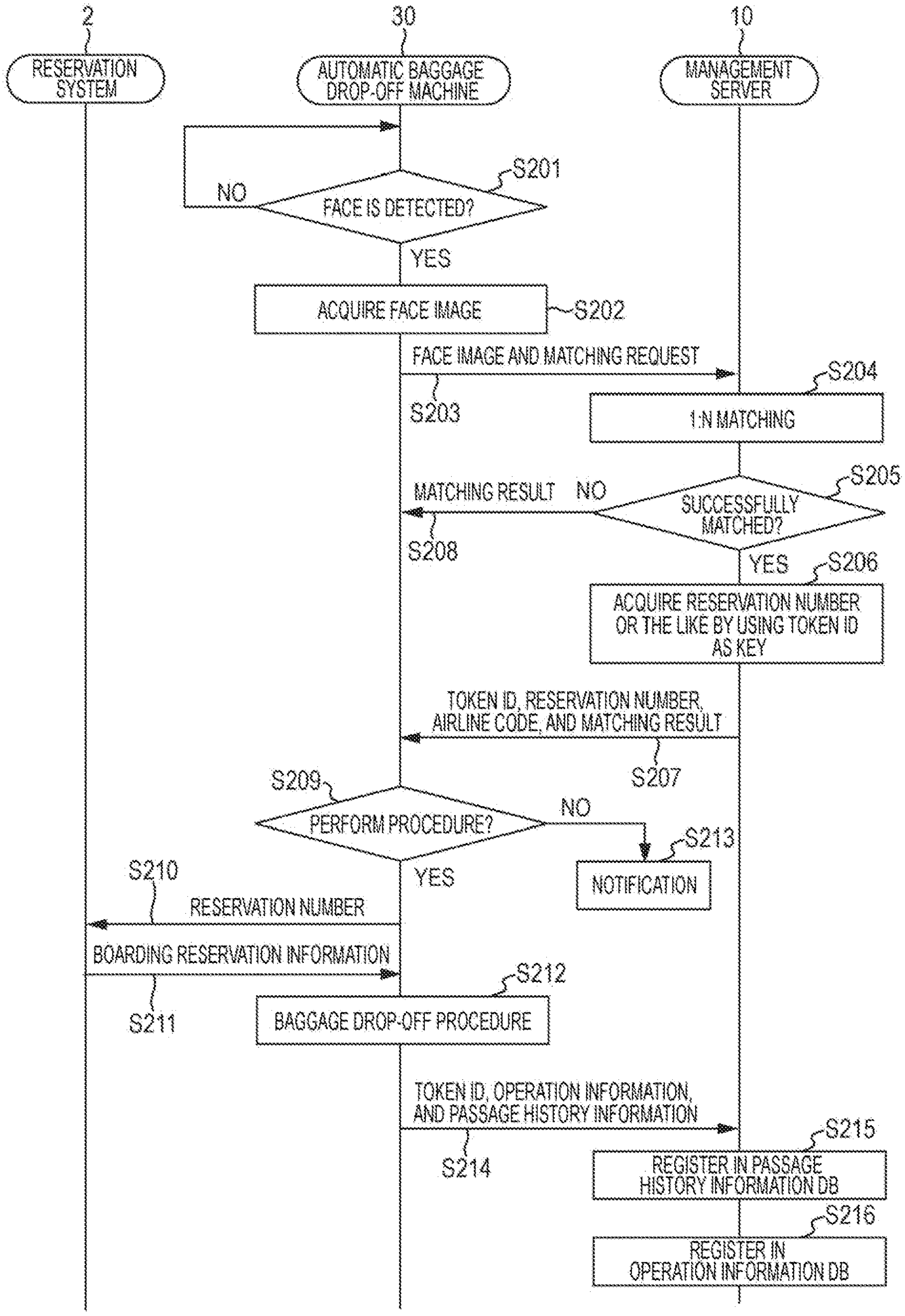
FIG. 15 is a sequence diagram illustrating one example of the process in the reservation system, the automatic baggage drop-off machine, and the management server in the first example embodiment.

FIG. 15 is a sequence diagram illustrating one example of the process in the reservation system 2, the automatic baggage drop-off machine 30, and the management server 10. This process is performed when the user U who completed a check-in procedure performs a baggage drop-off procedure if necessary.

The automatic baggage drop-off machine 30 continuously or periodically captures the area in front of the apparatus and determines whether or not a face of the user U standing in front of the automatic baggage drop-off machine 30 is detected in the captured image (step S201). The automatic baggage drop-off machine 30 stands by until a face of the user U is detected in an image by the biometric information acquisition device 309 (step S201, NO).

If it is determined that a face of the user U is detected by the biometric information acquisition device 309 (step S201, YES), the automatic baggage drop-off machine 30 captures the face of the user U and acquires the face image of the user U as a target face image (step S202).

Next, the automatic baggage drop-off machine 30 transmits the target face image of the user U captured by the biometric information acquisition device 309 to the management server 10 together with a matching request (step S203). Thereby, the automatic baggage drop-off machine 30 requests the management server 10 to match, at 1:N, the target face image of the user U captured by the biometric information acquisition device 309 with a plurality of registered face images registered in the token ID information DB 11 of the management server 10.

In response to receiving the target face image and the matching request from the automatic baggage drop-off machine 30, the management server 10 performs matching of the face image of the user U (step S204). That is, the management server 10 matches, at 1:N, the target face image received from the automatic baggage drop-off machine 30 with a plurality of registered face images registered in the token ID information DB 11. Note that the registered face images to be matched are limited to images associated with the token ID whose invalid flag has a value of "1" (valid).

Herein, if the management server 10 determines that the matching result indicates an unsuccessful matching (step S205, NO), the management server 10 transmits the unsuccessful matching result to the automatic baggage drop-off machine 30 (step S208), and the process proceeds to step S209. Contrarily, if the management server 10 determines that the matching result indicates a successful matching (step S205, YES), the process proceeds to step S206.

In step S206, the management server 10 acquires the token ID associated with the successfully matched registered face image in the token ID information DB 11 and acquires a reservation number and an airline code from the operation information DB 13 by using the token ID as a key. The management server 10 then transmits the token ID, the reservation number, the airline code, and the matching result to the automatic baggage drop-off machine 30 (step S207).

Next, if it is determined based on the matching result that the procedure can be performed (step S209, YES), the automatic baggage drop-off machine 30 transmits the reservation number to the reservation system 2 of an airline company corresponding to the airline code (step S210) and inquires boarding reservation information.

Contrarily, if it is determined based on the matching result that the procedure is not performed (step S209, NO), the automatic baggage drop-off machine 30 notifies the user U of an error message (step S213).

In response to receiving the reservation number from the automatic baggage drop-off machine 30, the reservation system 2 transmits the corresponding boarding reservation information to the automatic baggage drop-off machine 30 (step S211).

Next, in response to receiving the boarding reservation information from the reservation system 2, the automatic baggage drop-off machine 30 performs a baggage drop-off procedure of the user U (step S212).

Next, the automatic baggage drop-off machine 30 transmits, to the management server 10, the token ID, the operation information, and passage history information indicating that the baggage drop-off procedure of the user U completed after the matching of the face image (step S214). Note that the passage history information includes information such as the passage time at the touch point P2, a device name of the used terminal, or the like.

In response to receiving the information from the automatic baggage drop-off machine 30, the management server 10 registers, in the passage history information DB 12, passage history information indicating the relationship between the token ID and the passage information at the touch point P2 on the user U (step S215). The management server 10 then registers the operation information received from the automatic baggage drop-off machine 30 in the operation information DB 13 if necessary (step S216).

[Security Inspection Procedure]

Figure 16:
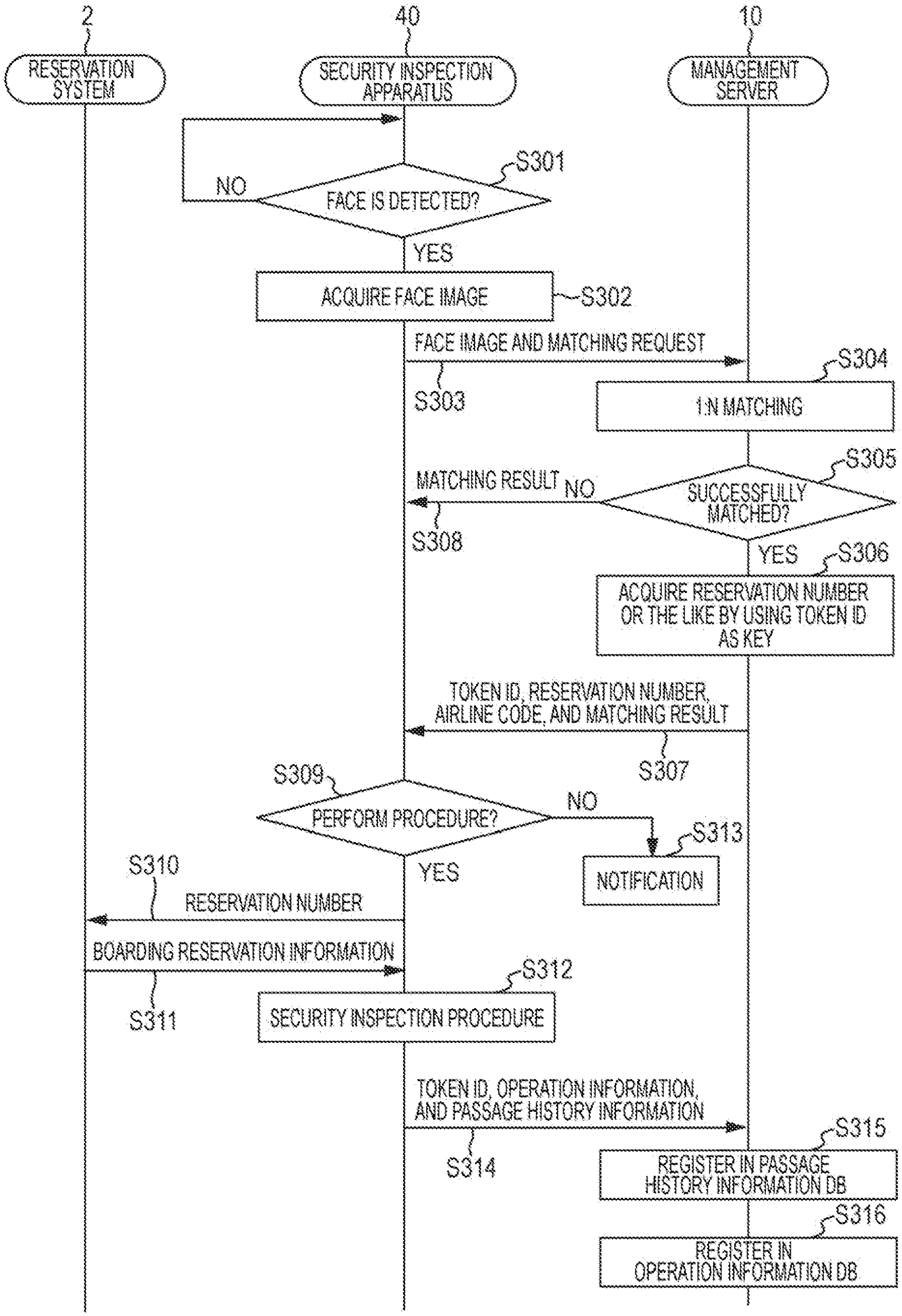
FIG. 16 is a sequence diagram illustrating one example of the process in the reservation system, the security inspection apparatus, and the management server in the first example embodiment.

FIG. 16 is a sequence diagram illustrating one example of the process in the reservation system 2, the security inspection apparatus 40, and the management server 10. This process is performed when the user U who completed a check-in procedure or a baggage drop-off procedure goes through a security inspection procedure.

The security inspection apparatus 40 continuously or periodically captures the front area of the metal detector gate 410 and determines whether or not a face of the user U standing in front of the metal detector gate 410 is detected in a captured image (step S301). The security inspection apparatus 40 stands by until a face of the user U is detected in an image by the biometric information acquisition device 409 (step S301, NO).

If it is determined that a face of the user U is detected by the biometric information acquisition device 409 (step S301, YES), the security inspection apparatus 40 captures the face of the user U and acquires the face image of the user U as a target face image (step S302).

Next, the security inspection apparatus 40 transmits the target face image of the user U captured by the biometric information acquisition device 409 to the management server 10 together with a matching request (step S303). Thereby, the security inspection apparatus 40 requests the management server 10 to match, at 1:N, the target face image of the user U captured by the biometric information acquisition device 409 with a plurality of registered face images registered in the token ID information DB 11 of the management server 10.

In response to receiving the target face image and the matching request from the security inspection apparatus 40, the management server 10 performs matching of the face image of the user U (step S304). That is, the management server 10 matches, at 1:N, the target face image received from the security inspection apparatus 40 with a plurality of registered face images registered in the token ID information DB 11. Note that the registered face images to be matched are limited to images associated with the token ID whose invalid flag has a value of "1" (valid).

Herein, if the management server 10 determines that the matching result indicates an unsuccessful matching (step S305, NO), the management server 10 transmits the matching result of the unsuccessful matching to the security inspection apparatus 40 (step S308), and the process proceeds to step S309. Contrarily, if the management server 10 determines that the matching result indicates a successful matching (step S305, YES), the process proceeds to step S306.

In step S306, the management server 10 acquires the token ID associated with the successfully matched registered face image in the token ID information DB 11 and acquires a reservation number and an airline code from the operation information DB 13 by using the token ID as a key. The management server 10 then transmits the token ID, the reservation number, the airline code, and the matching result to the security inspection apparatus 40 (step S307). The process proceeds to step S309.

Next, if it is determined based on the matching result that the procedure can be performed (step S309, YES), the security inspection apparatus 40 transmits the reservation number to the reservation system 2 of an airline company corresponding to the airline code (step S310) and inquires boarding reservation information.

Contrarily, if it is determined based on the matching result that the procedure is not performed (step S309, NO), the security inspection apparatus 40 notifies the user U of an error message (step S313).

In response to receiving the reservation number from the security inspection apparatus 40, the reservation system 2 transmits the corresponding boarding reservation information to the security inspection apparatus 40 (step S311).

Next, in response to receiving the boarding reservation information from the reservation system 2, the security inspection apparatus 40 performs a security inspection procedure of the user U (step S312). In the security inspection process, the CPU 401 controls each component of the security inspection apparatus 40. Thereby, the security inspection apparatus 40 detects a metal worn by the user U passing through the metal detector gate 410. The user U who has passed through the metal detector gate 410 moves to an immigration area.

Next, the security inspection apparatus 40 transmits, to the management server 10, the token ID, the operation information, and passage history information indicating that the security inspection procedure of the user U completed after the matching of the face image (step S314). Note that the passage history information includes information such as the passage time at the touch point P3, a device name of the used terminal, or the like.

In response to receiving the information from the security inspection apparatus 40, the management server 10 registers, in the passage history information DB 12, passage history information indicating the relationship between the token ID and the passage information at the touch point P3 on the user U (step S315). The management server 10 then registers the operation information received from the security inspection apparatus 40 in the operation information DB 13 if necessary (step S316).

[Immigration Procedure]

Figure 17:
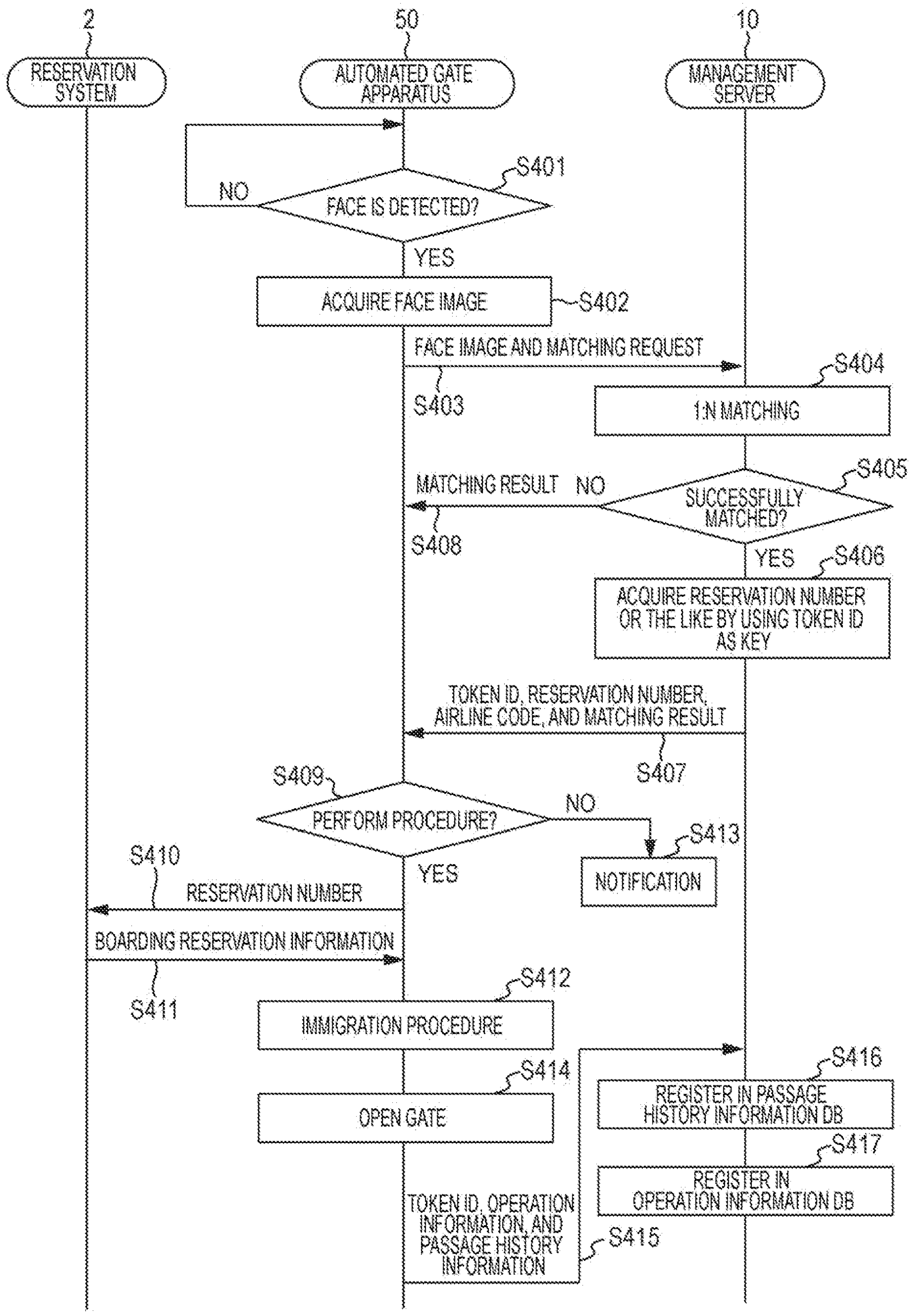
FIG. 17 is a sequence diagram illustrating one example of the process in the reservation system, the automated gate apparatus, and the management server in the first example embodiment.

FIG. 17 is a sequence diagram illustrating one example of the process in the reservation system 2, the automated gate apparatus 50, and the management server 10. This process is performed when the user U goes through an immigration procedure.

The automated gate apparatus 50 continuously or periodically captures the front area of the automated gate apparatus 50 and determines whether or not a face of the user U standing in front of the automated gate apparatus 50 is detected in a captured image (step S401). The automated gate apparatus 50 stands by until a face of the user U is detected in an image by the biometric information acquisition device 509 (step S401, NO).

If it is determined that a face of the user U is detected by the biometric information acquisition device 509 (step S401, YES), the automated gate apparatus 50 captures the face of the user U and acquires the face image of the user U as a target face image (step S402).

Next, the automated gate apparatus 50 transmits the target face image of the user U captured by the biometric information acquisition device 509 to the management server 10 together with a matching request (step S403). Thereby, the automated gate apparatus 50 requests the management server 10 to match, at 1:N, the target face image of the user U captured by the biometric information acquisition device 509 with a plurality of registered face images registered in the token ID information DB 11 of the management server 10.

In response to receiving the target face image and the matching request from the automated gate apparatus 50, the management server 10 performs matching of the face image of the user U (step S404). That is, the management server 10 matches, at 1:N, the target face image received from the automated gate apparatus 50 with a plurality of registered face images registered in the token ID information DB 11. Note that the registered face images to be matched are limited to images associated with the token ID whose invalid flag has a value of "1" (valid).

Herein, if the management server 10 determines that the matching result indicates an unsuccessful matching (step S405, NO), the management server 10 transmits the matching result of the unsuccessful matching to the automated gate apparatus 50 (step S408), and the process proceeds to step S409. Contrarily, if the management server 10 determines that the matching result indicates a successful matching (step S405, YES), the process proceeds to step S406.

In step S406, the management server 10 acquires the token ID associated with the successfully matched registered face image in the token ID information DB 11 and acquires a reservation number and an airline code from the operation information DB 13 by using the token ID as a key. The management server 10 then transmits the token ID, the reservation number, the airline code, and the matching result to the automated gate apparatus 50 (step S407). The process proceeds to step S409.

Next, if it is determined based on the matching result that the procedure can be performed (step S409, YES), the automated gate apparatus 50 transmits the reservation number to the reservation system 2 of an airline company corresponding to the airline code (step S410) and inquires boarding reservation information.

Contrarily, if it is determined based on the matching result that the procedure is not performed (step S409, NO), the automated gate apparatus 50 notifies the user U of an error message (step S413). For example, a notification screen including a message such as "Please move to immigration procedure at the manned counter" is displayed on the display device 507.

In response to receiving the reservation number from the automated gate apparatus 50, the reservation system 2 transmits the corresponding boarding reservation information to the automated gate apparatus 50 (step S411).

Next, in response to receiving the boarding reservation information from the reservation system 2, the automated gate apparatus 50 performs an immigration procedure of the user U (step S412) and opens the gate 511 (step S414). The user U who has passed through the touch point P4 moves to a departure area in which a boarding gate is provided.

Next, the automated gate apparatus 50 transmits, to the management server 10, the token ID, the operation information, and passage history information indicating that the immigration procedure of the user U completed after the matching of the face image (step S415). Note that the passage history information includes information such as the passage time at the touch point P4, a device name of the used terminal, or the like.

In response to receiving the information from the automated gate apparatus 50, the management server 10 registers, in the passage history information DB 12, passage history information indicating the relationship between the token ID and the passage information at the touch point P4 on the user U (step S416). The management server 10 then registers the operation information received from the automated gate apparatus 50 in the operation information DB 13 if necessary (step S417).

[Support of Procedure Before Boarding (1)]

Figure 18:
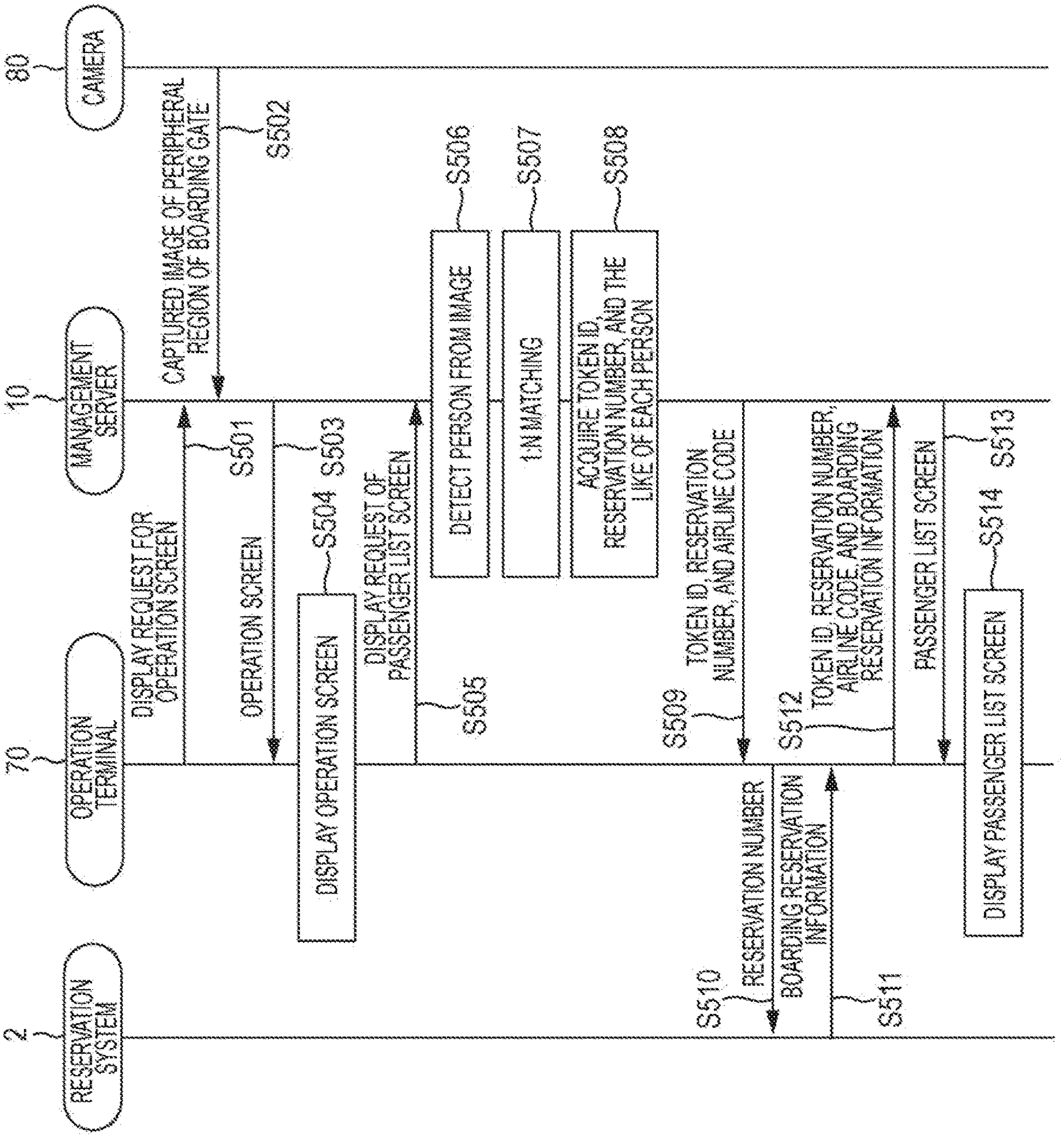
FIG. 18 is a sequence diagram illustrating one example of the process in the reservation system, the operation terminal, the management server, and the camera in the first example embodiment.

FIG. 18 is a sequence diagram illustrating one example of the process of the reservation system 2, the operation terminal 70, the management server 10, and the camera 80. This process is performed when the staff member S references information on a passenger included in a monitoring image of a peripheral region of a boarding gate, for example.

First, the operation terminal 70 transmits a display request for an operation screen to the management server 10 based on input information obtained from the staff member S (step S501). In response to receiving the display request from the operation terminal 70, the management server 10 acquires a captured image of the peripheral region of a boarding gate from the plurality of cameras 80 arranged in a distributed manner around the boarding gate (step S502).

Next, in response to acquiring the captured image from the cameras 80, the management server 10 transmits an operation screen including the captured image to the operation terminal 70 (step S503).

Next, the operation terminal 70 displays the operation screen received from the management server 10 on the display device 707 (step S504).

Figure 19:
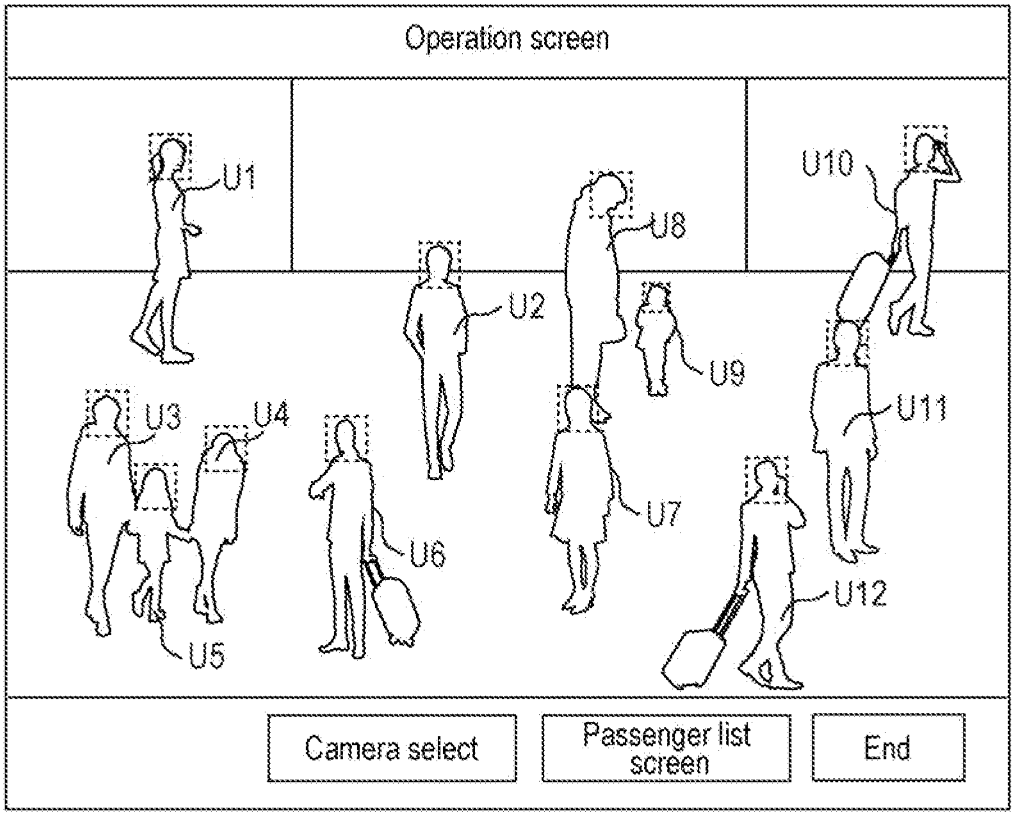
FIG. 19 is a diagram illustrating one example of the operation screen displayed on the operation terminal in the first example embodiment.

FIG. 19 is a diagram illustrating one example of the operation screen displayed on the operation terminal 70. A captured image is displayed in the center area of the screen. Each dashed line section in the captured image indicates a detected region of a face image of each of a plurality of users U1 to U12. Further, in the lower side region in the screen, a camera select button used for switching the displayed image to a captured image of another camera 80 having different capturing angle, a passenger list screen button used for displaying a list of passengers included in a captured image, and an end button used for closing the screen are displayed. Note that it is preferable that a passenger for which no token ID is registered or a passenger who is not authenticated be distinguished in a screen from a registered passenger (authenticated passenger) by a different display form.

Next, the operation terminal 70 transmits a display request for a passenger list screen to the management server 10 based on input information from the staff member S (step S505). In response to receiving the display request from the operation terminal 70, the management server 10 detects a person from the captured image of the peripheral region of the boarding gate (step S506). When a plurality of persons are included in a captured image, the management server 10 detects face images of all the persons as the target face images, respectively.

Next, the management server 10 matches, at 1:N, the target face image with a plurality of registered face images registered in the token ID information DB 11 (step S507). That is, the management server 10 specifies registered face images which are the same as the target face images of passengers included in the captured image, respectively. Note that the registered face images to be matched are limited to images associated with the token ID whose invalid flag has a value of "1" (valid). Furthermore, the passage history information DB 12 may be referenced, and only the image of the person who has passed through the immigration area may be a target to be matched.

Next, the management server 10 acquires the token ID associated with the successfully matched registered face image in the token ID information DB 11 and acquires a reservation number and an airline code of each person from the operation information DB 13 by using the token ID as a key (step S508). The management server 10 then transmits a data set of the token ID, the reservation number, and the airline code to the operation terminal 70 (step S509).

Next, in response to receiving the data set of each person from the management server 10, the operation terminal 70 sequentially transmits reservation numbers to the reservation system 2 of an airline company corresponding to the airline code (step S510) and inquires boarding reservation information for each person.

In response to receiving a reservation number of each person from the operation terminal 70, the reservation system 2 transmits the corresponding boarding reservation information to the operation terminal 70 (step S511).

Next, in response to receiving boarding reservation information on each person, the operation terminal 70 transmits the data set of the token ID, the reservation number, the airline code, and the boarding reservation information to the management server 10 (step S512).

Next, in response to receiving the data set of each person from the operation terminal 70, the management server 10 transmits a passenger list screen created based on the data set to the operation terminal 70 (step S513). The passenger list screen includes boarding reservation information associated with registered face images specified by biometric authentication, respectively.

The operation terminal 70 then displays the passenger list screen received from the management server 10 on the display device 707 (step S514).

Figure 20:
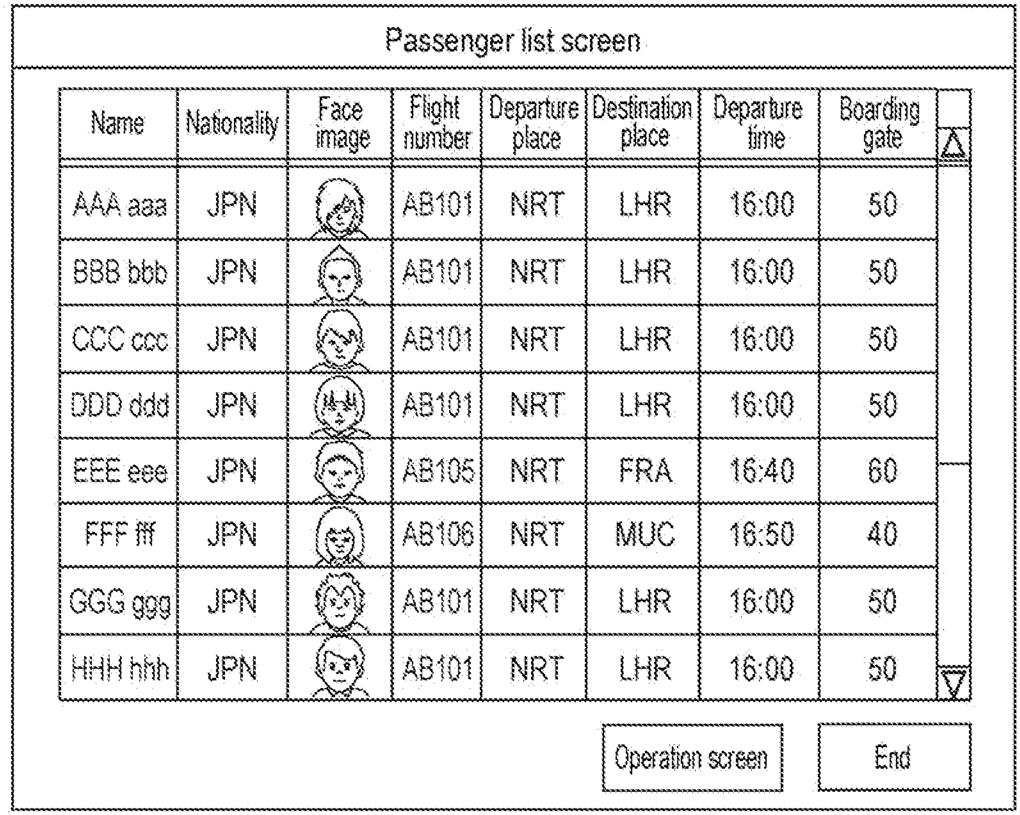
FIG. 20 is a diagram illustrating one example of a passenger list screen displayed on the operation terminal in the first example embodiment.

FIG. 20 is a diagram illustrating one example of the passenger list screen displayed on the operation terminal 70. In this example, boarding reservation information ("name", "nationality", "flight number", "departure place", "destination place", "departure time", "boarding gate") and face images of a plurality of persons detected from the captured image are displayed in a list form. Note that displayed data items are not limited to the above. For example, it is preferable to display information on a membership category, priority at boarding guide, and a waiting place (waiting lane) before boarding corresponding to the priority in addition to the above. In such a case, by referencing this passenger list screen, the staff member S can easily find a passenger who might have made a mistake in the place of a boarding gate or a waiting lane and guide such a passenger to a correct place.

[Support of Procedure Before Boarding (2)]

Figure 21:
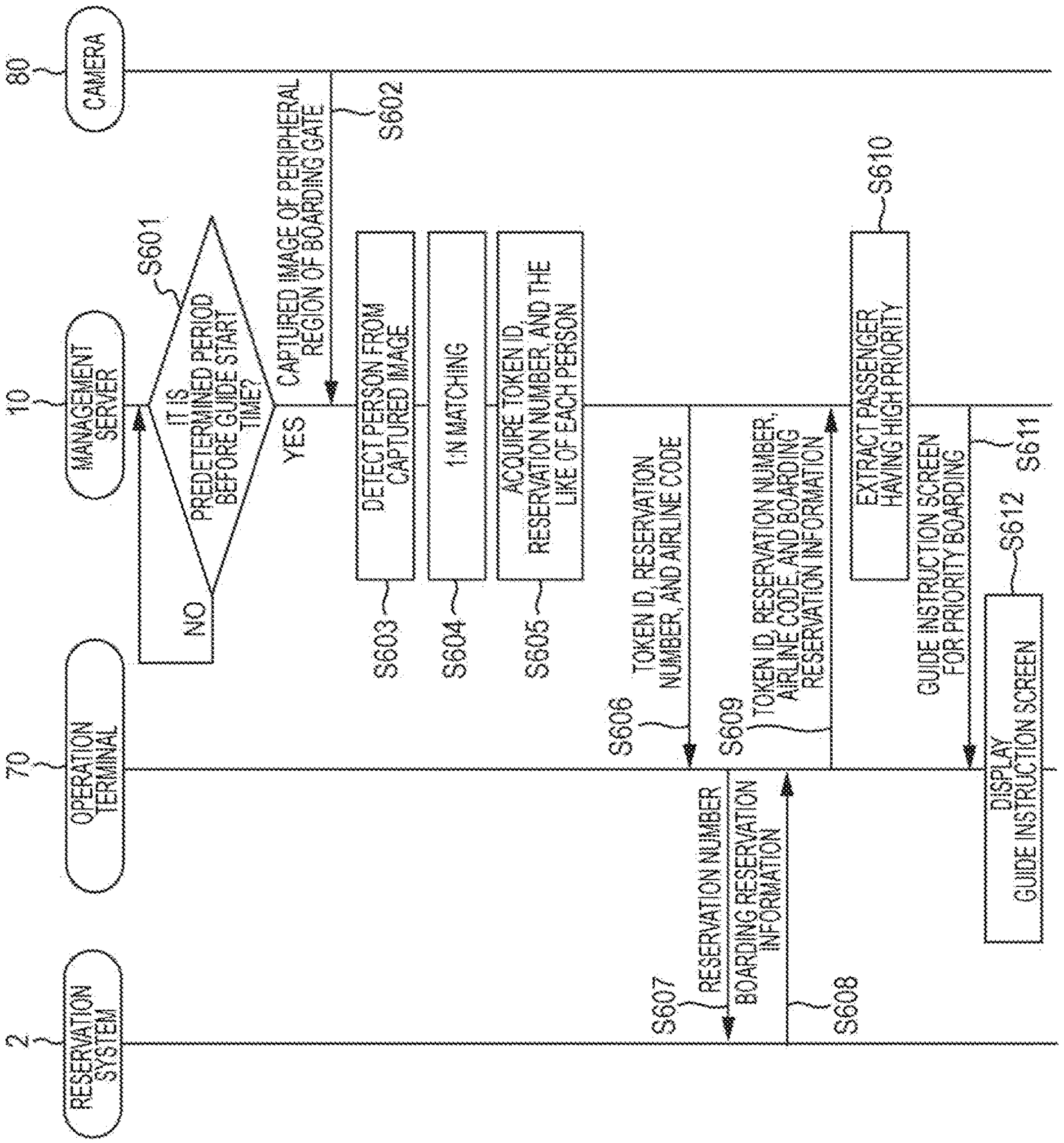
FIG. 21 is a sequence diagram illustrating one example of the process in the reservation system, the operation terminal, the management server, and the camera in the first example embodiment.

FIG. 21 is a sequence diagram illustrating one example of the process in the reservation system 2, the operation terminal 70, the management server 10, and the camera 80. This process is performed for each boarding gate in order to notify the staff member S of a target person for priority boarding.

First, the management server 10 determines whether or not the current time is a predetermined period before the time to start guide of priority boarding (step S601). In this step, if it is determined that the current time is the predetermined period before the time to start guide (step S601, YES), the management server 10 acquires a captured image of the peripheral region of a boarding gate from the camera 80 (step S602). The process then proceeds to step S603. Contrarily, if it is determined that the current time is not the predetermined period before the time to start guide (step S601, NO), the management server 10 stands by until the current time becomes the predetermined period before the time to start guide.

In step S603, the management server 10 detects a person from the captured image of the peripheral region of the boarding gate. When a plurality of persons are included in a captured image, the management server 10 detects face images of all the persons as target face images, respectively.

Next, the management server 10 matches, at 1:N, the target face image with a plurality of registered face images registered in the token ID information DB 11 (step S604). Note that the registered face images to be matched are limited to images associated with the token ID whose invalid flag has a value of "1" (valid). Furthermore, the passage history information DB 12 may be referenced, and only the image of the person who has passed through the immigration area may be a target to be matched.

Next, the management server 10 acquires the token ID associated with the successfully matched registered face image in the token ID information DB 11 and acquires a reservation number and an airline code of each person from the operation information DB 13 by using the token ID as a key (step S605). The management server 10 then transmits a data set of the token ID, the reservation number, and the airline code to the operation terminal 70 (step S606).

Next, in response to receiving the data set of each person from the management server 10, the operation terminal 70 sequentially transmits reservation numbers to the reservation system 2 of an airline company corresponding to the airline code (step S607) and inquires boarding reservation information for each person.

In response to receiving a reservation number of each person from the operation terminal 70, the reservation system 2 transmits the corresponding boarding reservation information to the operation terminal 70 (step S608).

Next, in response to receiving boarding reservation information on each person, the operation terminal 70 transmits the data set of the token ID, the reservation number, the airline code, and the boarding reservation information to the management server 10 (step S609).

Next, in response to receiving the data set of each person from the operation terminal 70, the management server 10 determines priority in boarding guide based on information on a seat class, a membership category, and an accompanying person or the like on each person included in the data set and extracts a passenger having high priority (step S610).

Next, the management server 10 transmits a guide instruction screen of priority boarding for the extracted passenger to the operation terminal 70 (step S611).

The operation terminal 70 then displays the guide instruction screen of priority boarding received from the management server 10 on the display device 707 (step S612).

Figure 22:
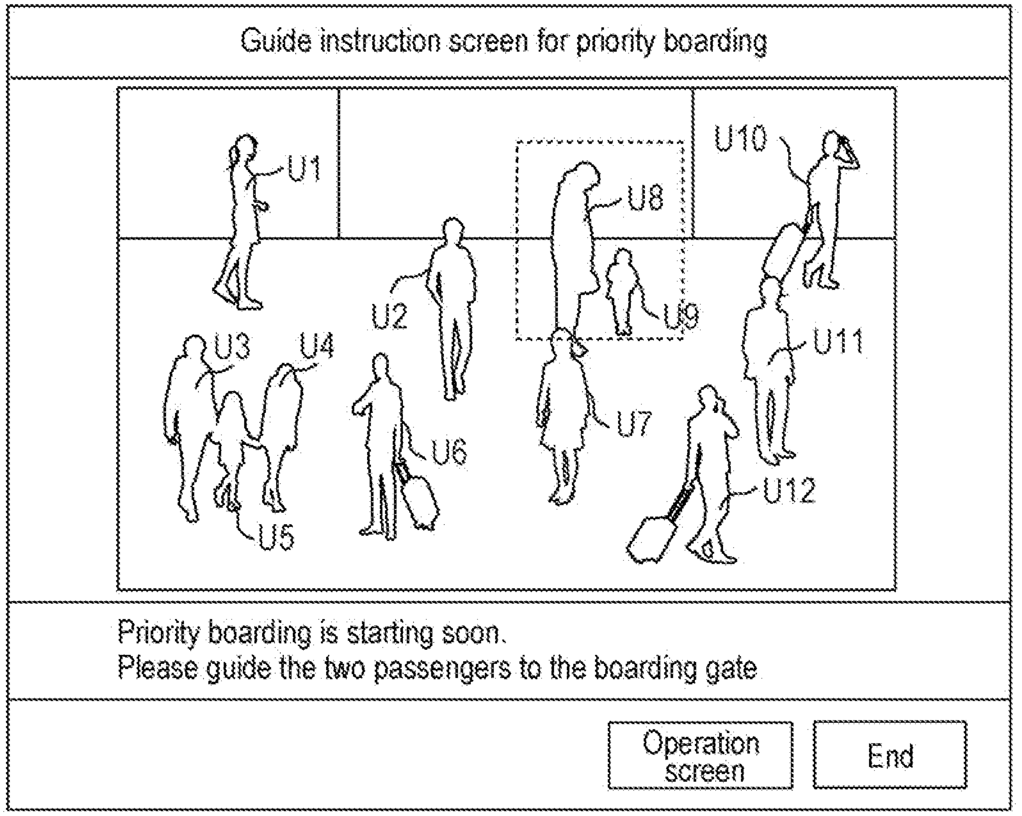
FIG. 22 is a diagram illustrating one example of a guidance instruction screen for priority boarding displayed on the operation terminal in the first example embodiment.

FIG. 22 is a diagram illustrating one example of a guide instruction screen of priority boarding displayed on the operation terminal 70. A captured image is displayed in the center area of the screen. The dashed line section in the image indicates a detected region of a parent and a child determined as passengers having the highest priority for boarding guide. Further, a message instructing the staff member S for priority boarding guide ("Priority boarding is starting soon. Please guide the two passengers to the boarding gate") is displayed in the lower side region in the screen.

[Support of Procedure Before Boarding (3)]

Figure 23:
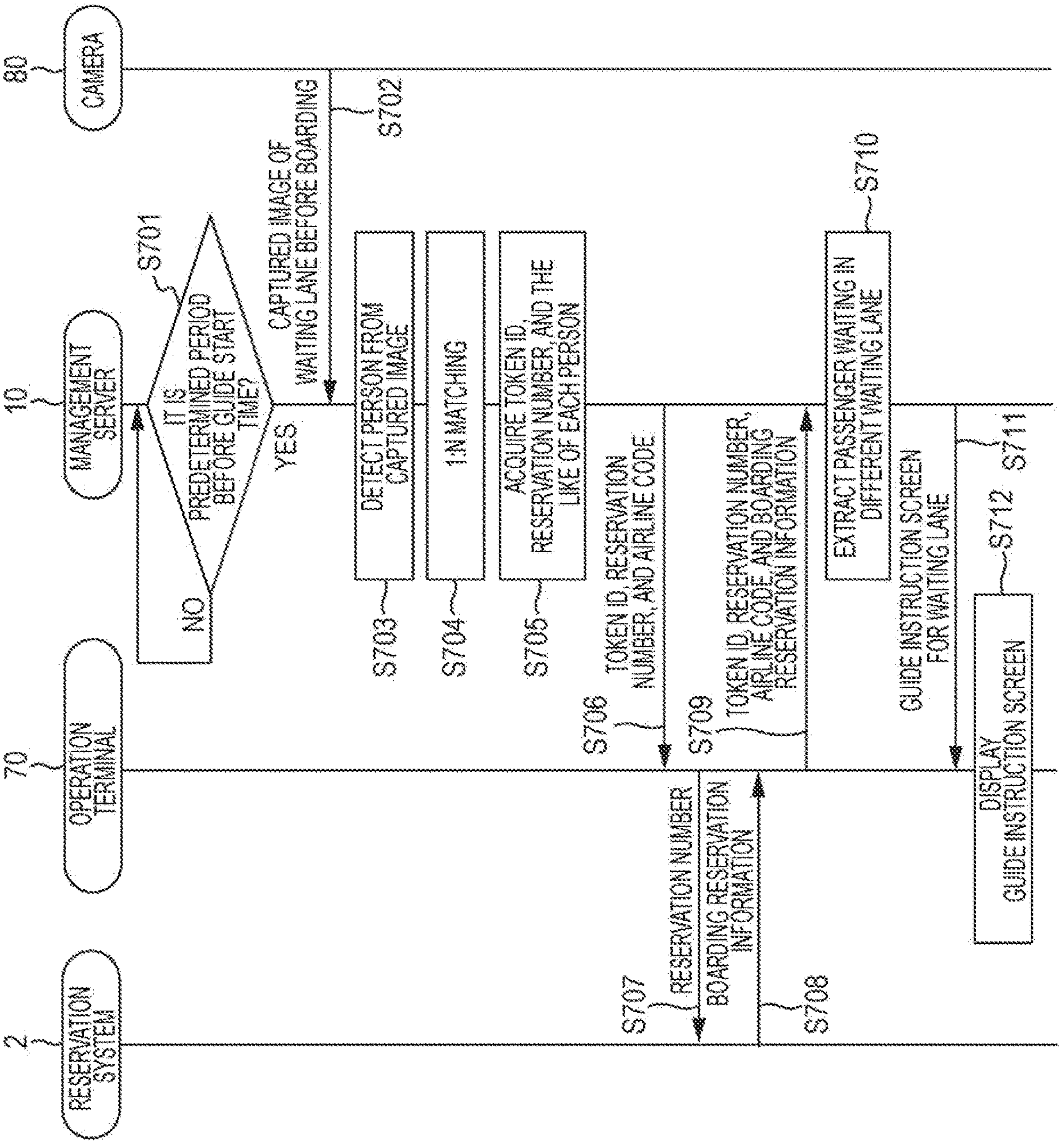
FIG. 23 is a sequence diagram illustrating one example of the process in the reservation system, the operation terminal, the management server, and the camera in the first example embodiment.

FIG. 23 is a sequence diagram illustrating one example of the process in the reservation system 2, the operation terminal 70, the management server 10, and the camera 80. This process is performed for guiding a passenger to an appropriate waiting lane in accordance with the priority of the passenger before starting priority boarding guide.

First, the management server 10 determines whether or not the current time is a predetermined period before the time to start guide of priority boarding (step S701). In this step, if it is determined that the current time is the predetermined period before the time to start guide (step S701, YES), the management server 10 acquires a captured image including a line of passengers waiting for boarding from the camera 80 (step S702). The process then proceeds to step S703. Contrarily, if it is determined that the current time is not the predetermined period before the time to start guide (step S701, NO), the management server 10 stands by until the current time is the predetermined period before the time to start guide.

In step S703, the management server 10 detects all the persons from the captured image including a line of passengers waiting for boarding.

Next, the management server 10 matches, at 1:N, the target face image with a plurality of registered face images registered in the token ID information DB 11 (step S704).

Next, the management server 10 acquires the token ID associated with a registered face image of a successful matching in the token ID information DB 11 and acquires a reservation number and an airline code of each person from the operation information DB 13 by using the token ID as a key (step S705). The management server 10 then transmits a data set of the token ID, the reservation number, and the airline code to the operation terminal 70 (step S706).

Next, in response to receiving the data set of each person from the management server 10, the operation terminal 70 sequentially transmits reservation numbers to the reservation system 2 of an airline company corresponding to the airline code (step S707) and inquires boarding reservation information for each person.

In response to receiving a reservation number of each person from the operation terminal 70, the reservation system 2 transmits the corresponding boarding reservation information to the operation terminal 70 (step S708).

Next, in response to receiving boarding reservation information on each person, the operation terminal 70 transmits the data set of the token ID, the reservation number, the airline code, and the boarding reservation information to the management server 10 (step S709).

Next, in response to receiving the data set of each person from the operation terminal 70, the management server 10 determines priority at boarding of each person based on information on a seat class, a membership category, and an accompanying person or the like on each person included in the data set and extracts a passenger whose priority is not matched to priority for the waiting lane, that is, a passenger who is waiting in a different waiting lane (step S710).

Next, the management server 10 transmits a guide instruction screen of a waiting lane for the extracted passenger to the operation terminal 70 (step S711). That is, when a passenger whose priority is different from the priority for the waiting place is included in passengers waiting in the waiting place, the management server 10 outputs information for suggesting guide to a correct waiting place corresponding to the priority of the passenger.

The operation terminal 70 then displays the guide instruction screen received from the management server 10 on the display device 707 (step S712).

Figure 24:
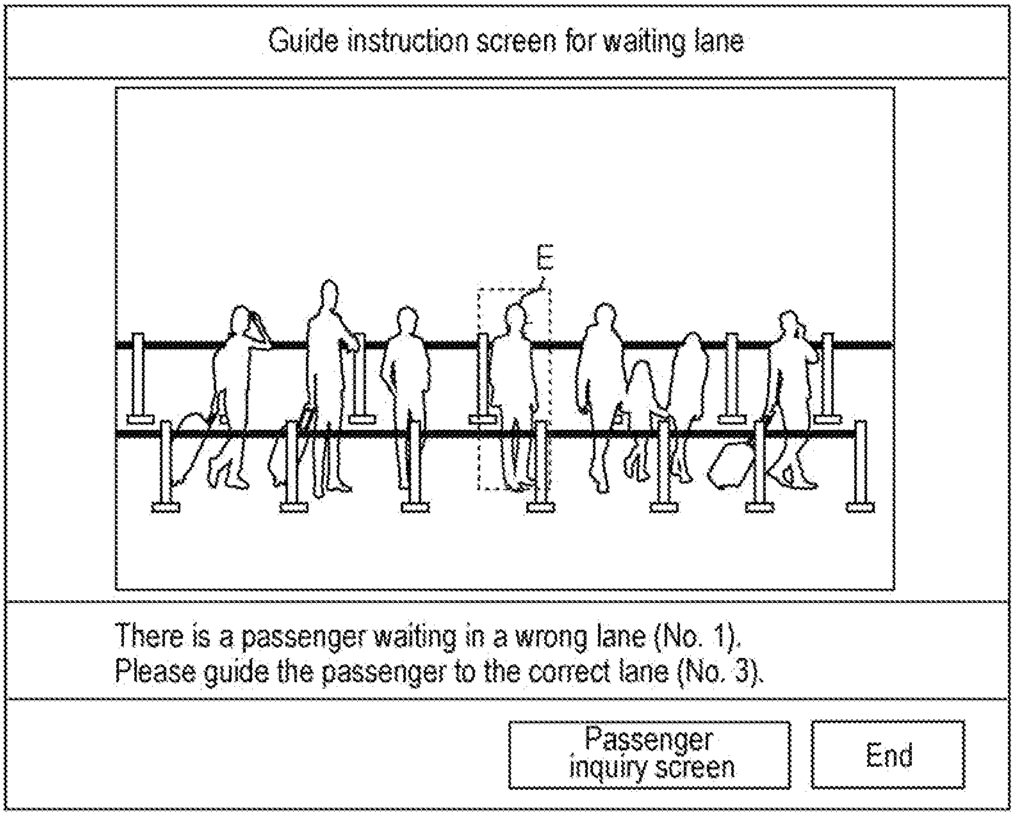
FIG. 24 is a diagram illustrating one example of a guide instruction screen for a waiting lane displayed on the operation terminal in the first example embodiment.

FIG. 24 is a diagram illustrating one example of a guide instruction screen of a waiting lane displayed on the operation terminal 70. A captured image in which a plurality of passengers before boarding are waiting in a waiting lane provided around the boarding gate is displayed in the center region of the screen. The dashed line section in the screen indicates a detected region of a passenger E waiting in a wrong waiting lane.

Further, an instruction message that instructs the staff member S to guide the passenger E to a correct waiting lane corresponding to the priority of the passenger E ("There is a passenger waiting in a wrong waiting lane (No. 1). Please guide the passenger to the correct waiting lane (No. 3)") is displayed in the lower side region in the screen.

[Support of Procedure Before Boarding (4)]

Figure 25:
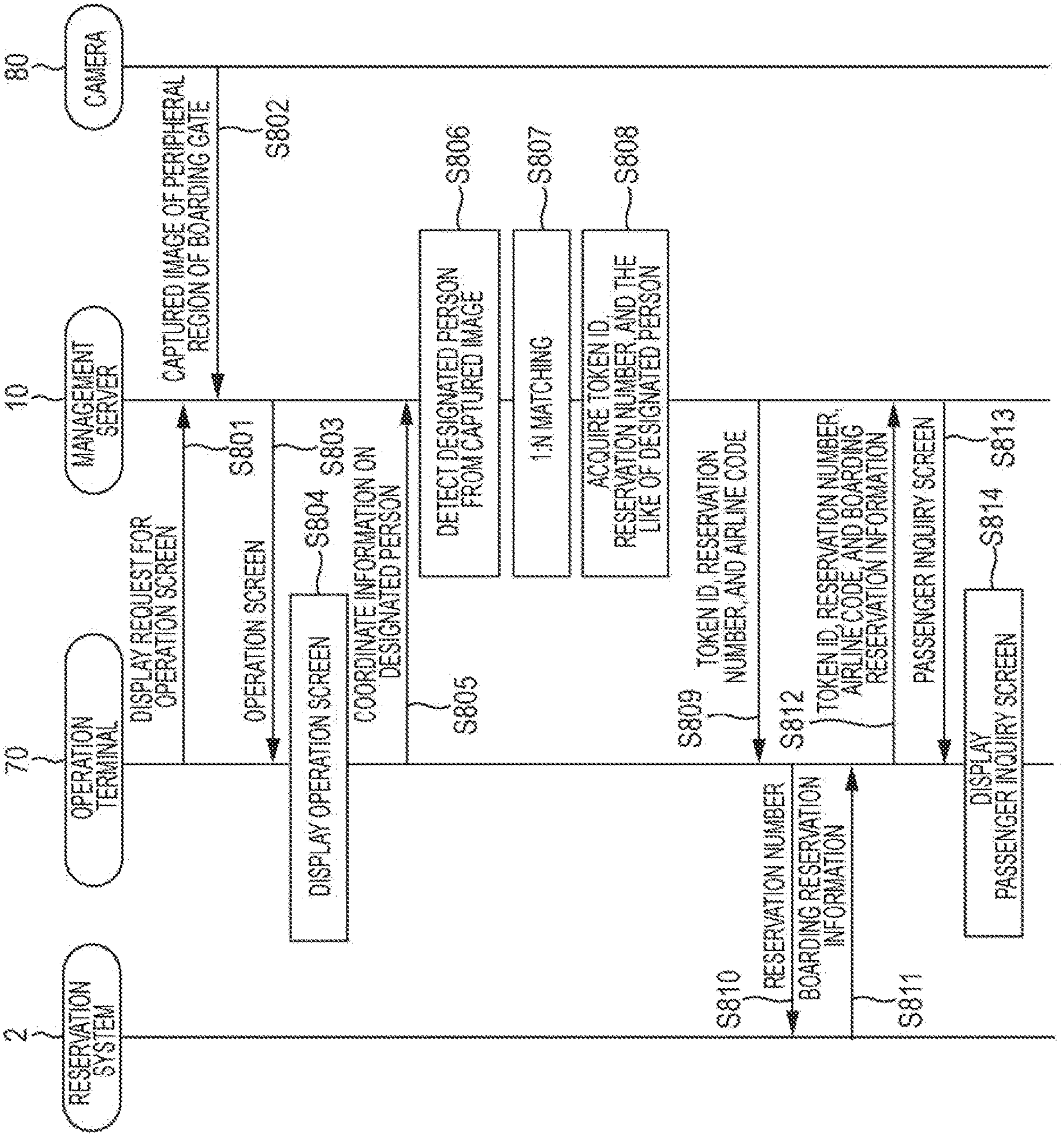
FIG. 25 is a sequence diagram illustrating one example of the process in the reservation system, the operation terminal, the management server, and the camera in the first example embodiment.

FIG. 25 is a sequence diagram illustrating one example of the process in the reservation system 2, the operation terminal 70, the management server 10, and the camera 80. This process is performed when the staff member S arbitrarily designates a person included in a captured image and inquires information on the designated person.

First, the operation terminal 70 transmits a display request for an operation screen to the management server 10 based on input information from the staff member S (step S801). In response to receiving the display request from the operation terminal 70, the management server 10 acquires a captured image of the peripheral region of a boarding gate from the plurality of cameras 80 arranged in a distributed manner around the boarding gate (step S802).

Next, in response to acquiring a captured image from the camera 80, the management server 10 transmits the operation screen including a captured image to the operation terminal 70 (step S803).

Next, the operation terminal 70 displays the operation screen received from the management server 10 on the display device 707 (step S804).

Next, the operation terminal 70 transmits, to the management server 10, coordinate information on a designated person within the operation screen of the staff member S (step S805). In response to receiving the coordinate information on the designated person from the operation terminal 70, the management server 10 detects the designated person from the captured image based on the coordinate information (step S806). A face image of the designated person cut out from the captured image is a target face image.

Next, the management server 10 matches, at 1:N, the target face image of the designated person with a plurality of registered face images registered in the token ID information DB 11 (step S807). That is, the management server 10 specifies a registered face image which is the same as the target face image of the passenger specified on the screen of the operation terminal 70 by the staff member S.

Next, the management server 10 acquires the token ID associated with the successfully matched registered face image in the token ID information DB 11 and acquires a reservation number and an airline code of the designated person from the operation information DB 13 by using the token ID as a key (step S808). The management server 10 then transmits a data set of the token ID, the reservation number, and the airline code to the operation terminal 70 (step S809).

Next, in response to receiving the data set of the designated person from the management server 10, the operation terminal 70 transmits reservation numbers to the reservation system 2 of an airline company corresponding to the airline code (step S810) and inquires boarding reservation information.

In response to receiving a reservation number of the designated person from the operation terminal 70, the reservation system 2 transmits the corresponding boarding reservation information to the operation terminal 70 (step S811).

Next, in response to receiving boarding reservation information on the designated person, the operation terminal 70 transmits the data set of the token ID, the reservation number, the airline code, and the boarding reservation information to the management server 10 (step S812).

Next, in response to receiving the data set of the designated person from the operation terminal 70, the management server 10 transmits a passenger inquiry screen created based on the data set to the operation terminal 70 (step S813). That is, the management server 10 outputs boarding reservation information associated with a registered face image of a designated person to the operation terminal 70.

Next, the operation terminal 70 displays the passenger inquiry screen received from the management server 10 on the display device 707 (step S814).

Figure 26:
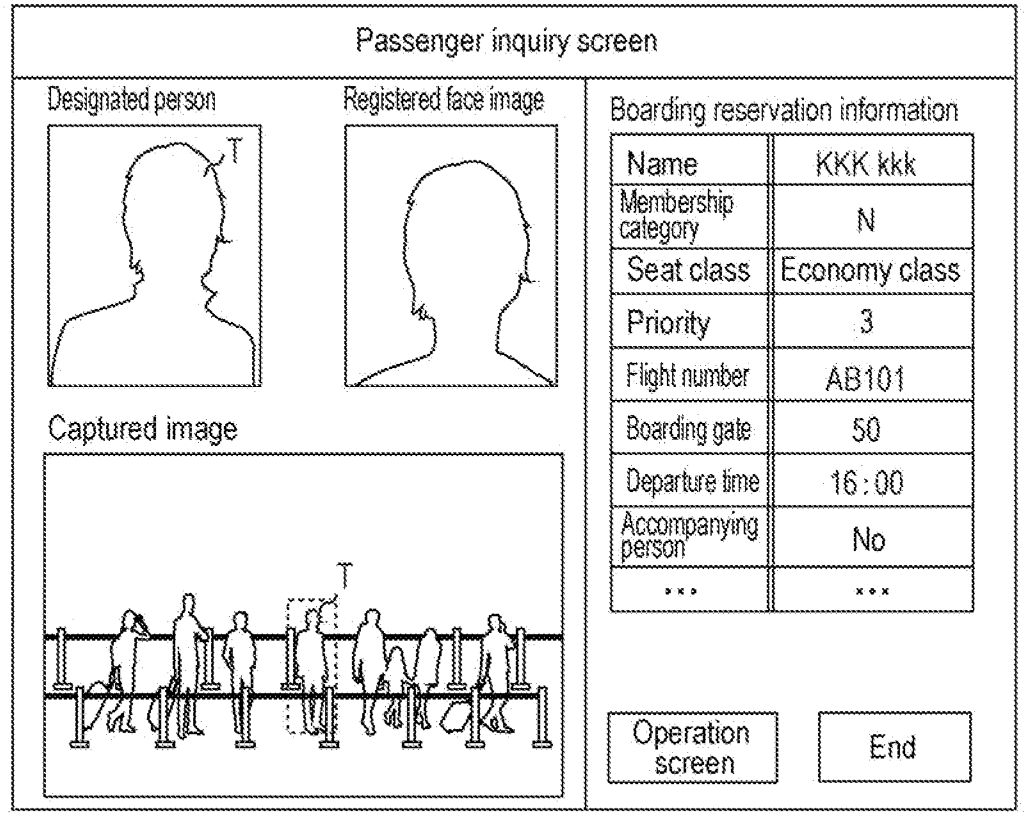
FIG. 26 is a diagram illustrating one example of a passenger inquiry screen displayed on the operation terminal in the first example embodiment.

FIG. 26 is a diagram illustrating one example of a passenger inquiry screen displayed on the operation terminal 70. In the left side region in the screen, the captured image (captured image), the target face image of the designated person extracted from the captured image, and the registered face image successfully matched with the target face image are displayed. The dashed line section in the captured image is a detected region of the designated person T. Further, in the right side region in the screen, boarding reservation information on the designated persons is displayed in a list form as an inquiry result.

For example, when the staff member S designates any person in the operation screen, the management server 10 specifies a passenger based on a face image of the designated person and displays the boarding reservation information in the screen. Thereby, the staff member S can confirm boarding reservation information on a passenger included in a captured image in advance and use the confirmed boarding reservation information in the operation.

[Support of Procedure Before Boarding (5)]

Figure 27:
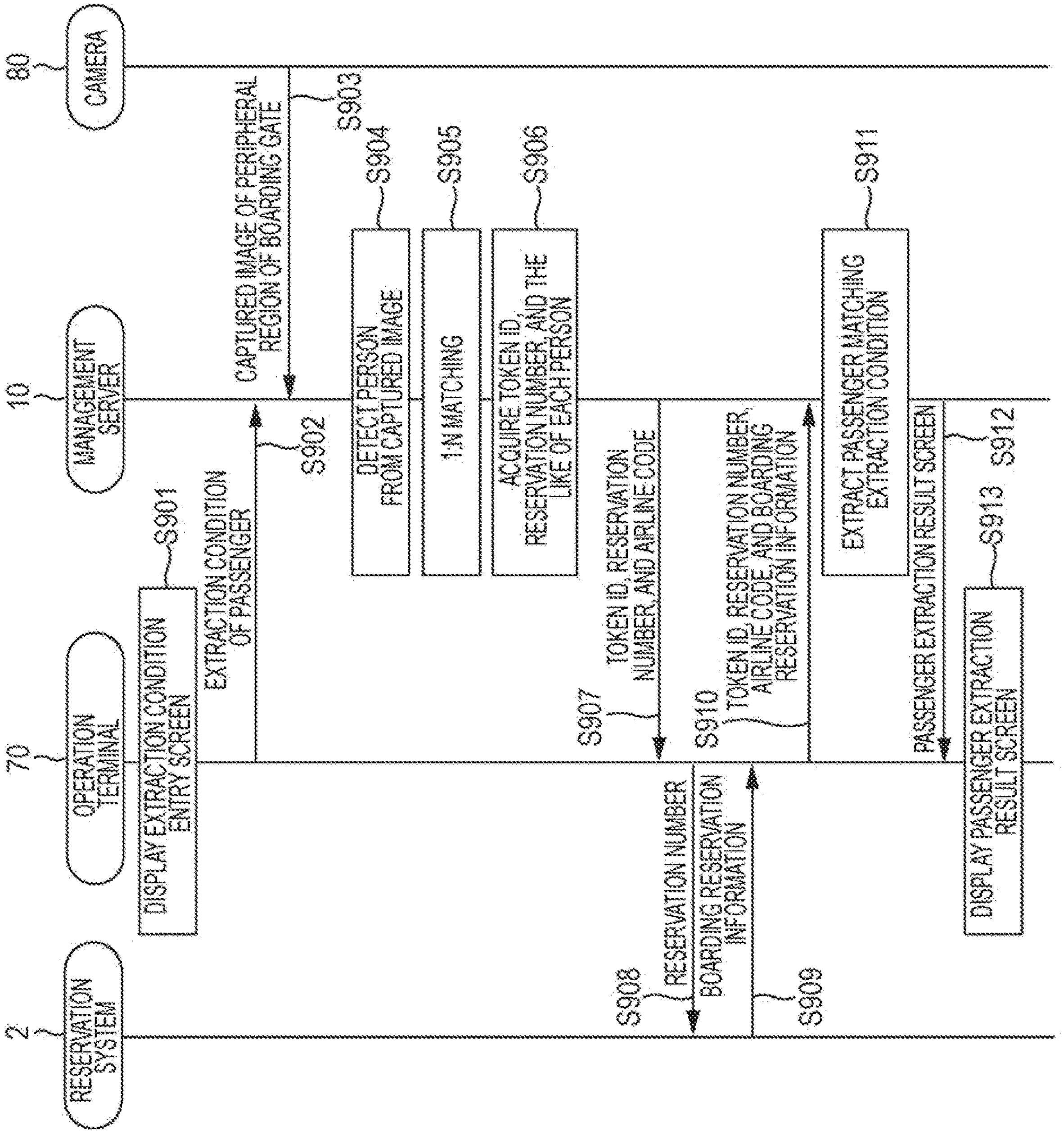
FIG. 27 is a sequence diagram illustrating one example of the process in the reservation system, the operation terminal, the management server, and the camera in the first example embodiment.

FIG. 27 is a sequence diagram illustrating one example of the process in the reservation system 2, the operation terminal 70, the management server 10, and the camera 80. This process is performed when the staff member S extracts a desired passenger from passengers present around a boarding gate.

Figure 28:
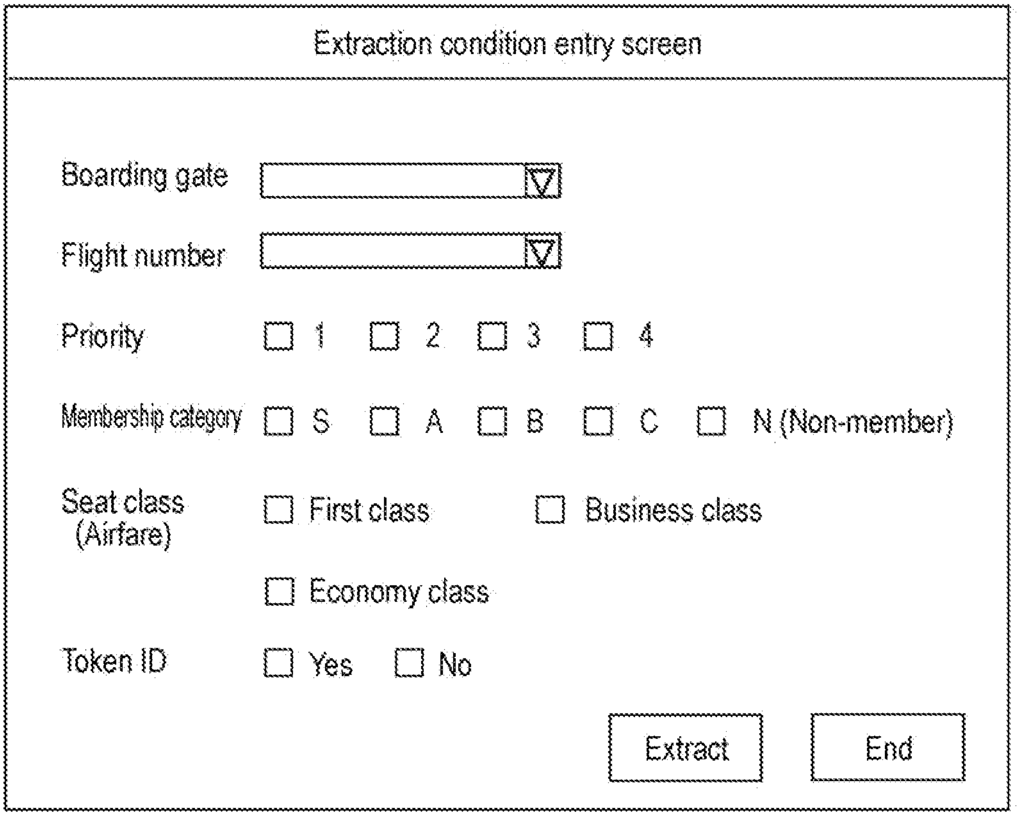
FIG. 28 is a diagram illustrating one example of an extraction condition entry screen displayed on the operation terminal in the first example embodiment.

First, the operation terminal 70 displays an extraction condition entry screen (step S901). FIG. 28 is a diagram illustrating one example of the extraction condition entry screen displayed on the operation terminal 70. Herein, as extraction conditions, “boarding gate”, “flight number”, “priority”, “membership category”, “seat class”, and “with or without token ID” are illustrated as an example. When the staff member S intends to extract only the passenger having the highest priority for boarding guide out of a plurality of passengers included in a captured image, for example, the staff member S may set a checkbox regarding priority (“1”) to ON.

Next, the operation terminal 70 transmits the extraction condition input by the staff member S in the extraction condition entry screen to the management server 10 (step S902).

Next, in response to receiving the extraction condition from the operation terminal 70, the management server 10 acquires a captured image of the peripheral region of a boarding gate from the plurality of cameras 80 arranged in a distributed manner around the boarding gate (step S903).

Next, in response to acquiring the captured image from the cameras 80, the management server 10 detects all the persons from the captured image (step S904).

Next, the management server 10 matches, at 1:N, the target face image of the detected person with a plurality of registered face images registered in the token ID information DB 11 (step S905).

Next, the management server 10 acquires the token ID associated with a registered face image of a successful matching in the token ID information DB 11 and acquires a reservation number and an airline code of each person from the operation information DB 13 by using the token ID as a key (step S906). The management server 10 then transmits a data set of the token ID, the reservation number, and the airline code to the operation terminal 70 (step S907).

Next, in response to receiving the data set of each person from the management server 10, the operation terminal 70 sequentially transmits reservation numbers to the reservation system 2 of an airline company corresponding to the airline code (step S908) and inquires boarding reservation information for each person.

In response to receiving a reservation number of each person from the operation terminal 70, the reservation system 2 transmits the corresponding boarding reservation information to the operation terminal 70 (step S909).

Next, in response to receiving boarding reservation information on each person, the operation terminal 70 transmits the data set of the token ID, the reservation number, the airline code, and the boarding reservation information to the management server 10 (step S910).

Next, in response to receiving the data set of each person from the operation terminal 70, the management server 10 extracts a passenger matched to the extraction condition (step S911).

Next, the management server 10 transmits a passenger extraction result screen regarding the extracted passenger to the operation terminal 70 (step S912).

Next, the operation terminal 70 displays the passenger extraction result screen received from the management server 10 on the display device 707 (step S913).

Figure 29:
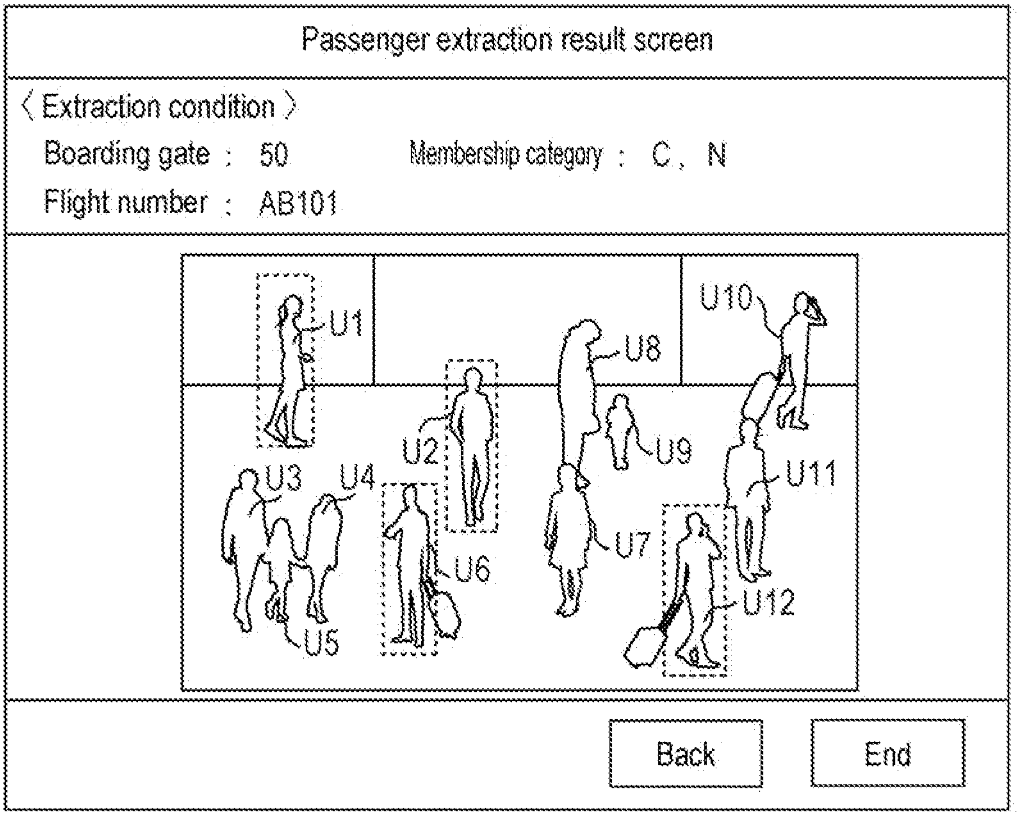
FIG. 29 is a diagram illustrating one example of a passenger extraction result screen displayed on the operation terminal in the first example embodiment.

FIG. 29 is a diagram illustrating one example of a passenger extraction result screen displayed on the operation terminal 70. In the upper side region in the screen, extraction conditions designated by the staff member S are displayed. Herein, three conditions of "boarding gate", "flight number", and "membership category" are designated. Further, in the center region of the screen, a captured image is displayed. A plurality of dashed line sections in the captured image are detected regions of passengers satisfying the extraction conditions. That is, the management server 10 can extract a passenger corresponding to boarding reservation information satisfying the extraction conditions input by the staff member S out of the passengers included in the captured image.

[Boarding Check at Boarding Gate]

Figure 30:
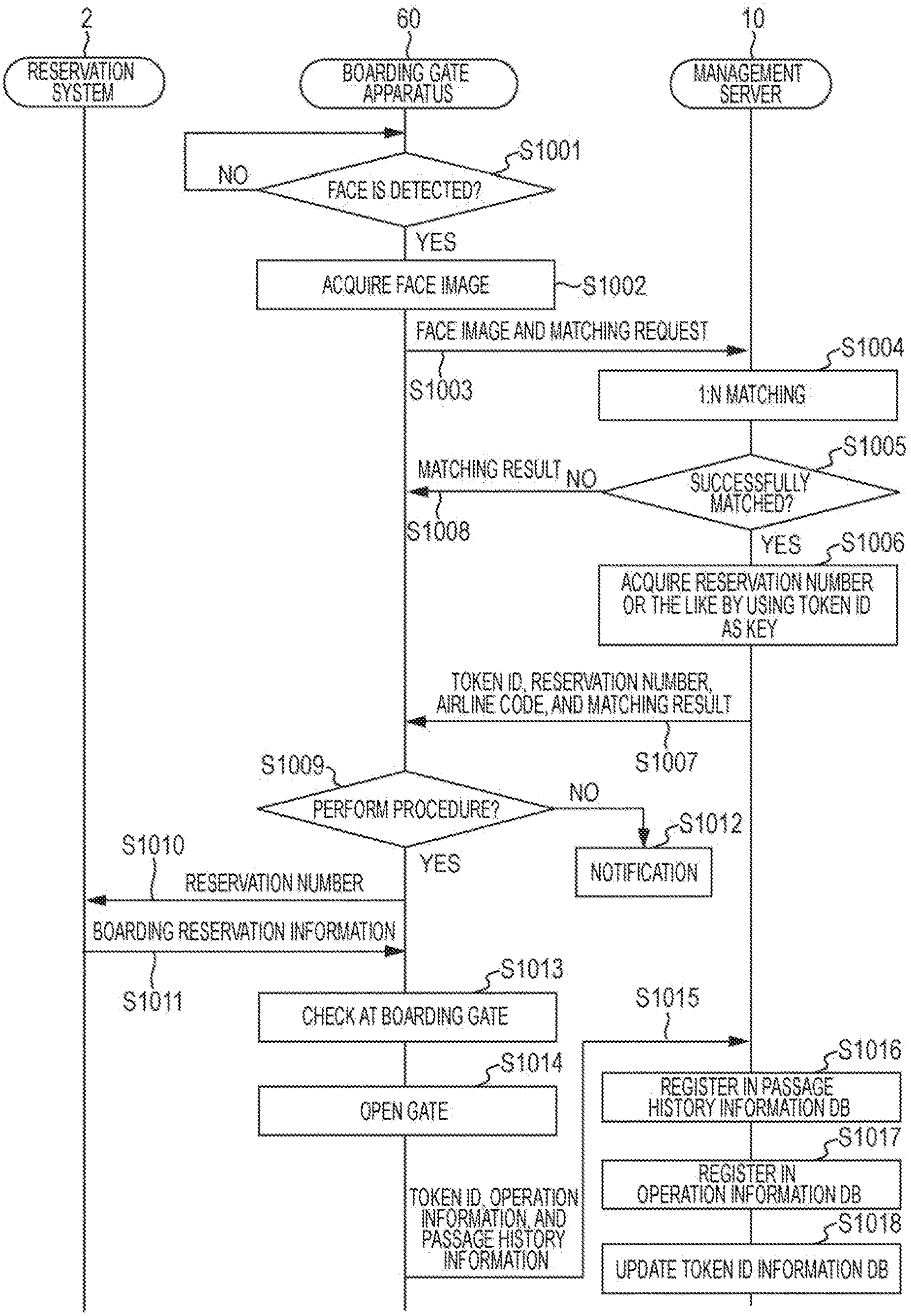
FIG. 30 is a sequence diagram illustrating one example of the process in the reservation system, the boarding gate apparatus, and the management server in the first example embodiment.

FIG. 30 is a sequence diagram illustrating one example of the process in the reservation system 2, the boarding gate apparatus 60, and the management server 10. This process is performed when the user U passes through a boarding gate.

The boarding gate apparatus 60 continuously or periodically captures the front area of the apparatus and determines whether or not a face of the user U standing in front of the boarding gate apparatus 60 is detected in a captured image (step S1001). The boarding gate apparatus 60 stands by until a face of the user U is detected in an image by the biometric information acquisition device 609 (step S1001, NO).

If it is determined that a face of the user U is detected by the biometric information acquisition device 609 (step S1001, YES), the boarding gate apparatus 60 captures the face of the user U and acquires the face image of the user U as a target face image (step S1002).

Next, the boarding gate apparatus 60 transmits the target face image of the user U captured by the biometric information acquisition device 609 to the management server 10 together with a matching request (step S1003). Thereby, the boarding gate apparatus 60 requests the management server 10 to match, at 1:N, the target face image of the user U captured by the biometric information acquisition device 609 with a plurality of registered face images registered in the token ID information DB 11 of the management server 10.

In response to receiving the target face image and the matching request from the boarding gate apparatus 60, the management server 10 performs matching of the face image of the user U (step S1004). That is, the management server 10 matches, at 1:N, the target face image received from the boarding gate apparatus 60 with a plurality of registered face images registered in the token ID information DB 11. Note that the registered face images to be matched are limited to images associated with the token ID whose invalid flag has a value of "1" (valid).

Herein, if the management server 10 determines that the matching result indicates an unsuccessful matching (step S1005, NO), the management server 10 transmits the matching result of the unsuccessful matching to the boarding gate apparatus 60 (step S1008), and the process proceeds to step S1009. Contrarily, if the management server 10 determines that the matching result indicates a successful matching (step S1005, YES), the process proceeds to step S1006.

In step S1006, the management server 10 acquires the token ID associated with the successfully matched registered face image in the token ID information DB 11 and acquires a reservation number and an airline code from the operation information DB 13 by using the token ID as a key. The management server 10 then transmits the token ID, the reservation number, the airline code, and the matching result to the boarding gate apparatus 60 (step S1007). The process proceeds to step S1009.

Next, if it is determined based on the matching result that the procedure can be performed (step S1009, YES), the boarding gate apparatus 60 transmits the reservation number to the reservation system 2 of an airline company corresponding to the airline code (step S1010) and inquires boarding reservation information.

Contrarily, if it is determined based on the matching result that the procedure is not performed (step S1009, NO), the boarding gate apparatus 60 notifies the user U of an error message (step S1012). For example, the boarding gate apparatus 60 displays a notification screen including a message such as "Please move to procedure at the manned counter" on the display device 607.

In response to receiving the reservation number from the boarding gate apparatus 60, the reservation system 2 transmits the corresponding boarding reservation information to the boarding gate apparatus 60 (step S1011).

Next, in response to receiving the boarding reservation information from the reservation system 2, the boarding gate apparatus 60 performs check at the boarding gate for the user U based on the flight number, the gate number, the boarding start time, and the like included in the boarding reservation information (step S1013) and when permitting the boarding, opens the gate 611 (step S1014). The user U who has passed through the touch point P5 boards on an airplane. Note that, if the boarding gate apparatus 60 determines not to permit boarding in step S1013, it is preferable to notify the user U of an error message without opening the gate 611. For example, the gate 611 is not opened when the user U makes a mistake in the number of the gate 611, when the current time is before the time to the boarding start time, or the like.

Next, the boarding gate apparatus 60 transmits, to the management server 10, the token ID, the operation information, and passage history information indicating that the user U completed the boarding on the airplane after the matching of the face image (step S1015). Note that the passage history information includes information such as the passage time at the touch point P5, a device name of the used terminal, or the like.

In response to receiving the information from the boarding gate apparatus 60, the management server 10 registers, in the passage history information DB 12, passage history information at the touch point P5 on the user U (step S1016). The management server 10 then registers the operation information received from the boarding gate apparatus 60 in the operation information DB 13 if necessary (step S1017).

The management server 10 then updates the token ID information DB 11 (step S1018). Specifically, the management server 10 updates the invalid flag in the token ID information DB 11 to a value of invalidity ("0"). Thereby, the lifecycle of the token ID expires.

According to the present example embodiment, the management server 10 stores boarding reservation information on a passenger who is boarding on an airplane and a registered face image of the passenger in association with each other. Further, the management server 10 acquires a target face image of a passenger who has not yet boarded on an airplane from a captured image of a peripheral region of a boarding gate and specifies a registered face image which is the same as the target face image. Then, in response to specifying boarding reservation information associated with the specified registered face image, the management server 10 outputs information used for supporting a procedure of a passenger at a boarding gate to the operation terminal 70 used by the staff member S based on the boarding reservation information. Accordingly, a procedure at a boarding gate can be efficiently performed.

The management server 10 outputs priority in a procedure performed by a passenger at a boarding gate as information used for supporting the procedure of the passenger at the boarding gate. Accordingly, the staff member S can efficiently provide a service of priority boarding based on the priority of each passenger obtained from the captured image without checking a storage medium such as a passport, a boarding ticket, or the like.

Second Example Embodiment

The information processing system 1 in the present example embodiment will be described below. Note that a reference common to the reference provided in the drawings in the first example embodiment represents the same object. Description of features common to the first example embodiment will be omitted, and different features will be described in detail.

The present example embodiment is different from the first example embodiment in that a check process regarding an accompanying person of a passenger is further performed in the check at the time of boarding at a boarding gate (touch point P5).

[Accompanying Person Check in Boarding Gate]

Figure 31:
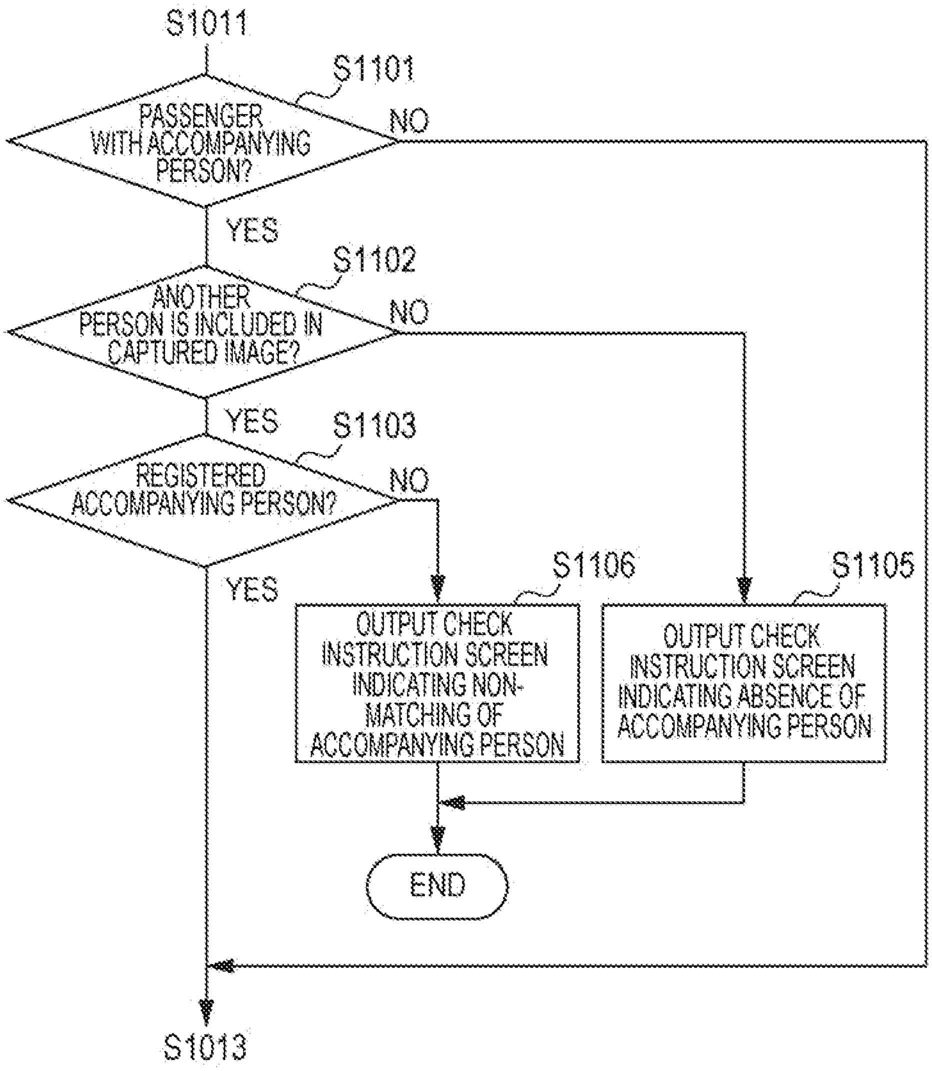
FIG. 31 is a flowchart illustrating one example of a check process of an accompanying person in a second example embodiment.

FIG. 31 is a flowchart illustrating one example of a check process of an accompanying person. This process is performed by the management server 10 between step S1011 and step S1013 of FIG. 30 described above, for example.

The management server 10 determines whether or not a target person under a boarding check at a boarding gate is a passenger having an accompanying person based on boarding reservation information received from the reservation system 2 (step S1101). In this step, if the management server 10 determines that the target person is a passenger having an accompanying person (step S1101, YES), the process proceeds to step S1102.

Contrarily, if the management server 10 determines that the target person is a passenger having no accompanying person (step S1101, NO), the process proceeds to step S1013.

In step S1102, the management server 10 determines whether or not another person is included in the captured image. In this step, if the management server 10 determines that another person is included in the captured image (step S1102, YES), the process proceeds to step S1103.

Contrarily, if the management server 10 determines that another person is not included in the captured image (step S1102, NO), the process proceeds to step S1105.

In step S1103, the management server 10 determines whether or not a person included in the captured image is a person registered as an accompanying person. In this step, if the management server 10 determines that the person included in the captured image is a person registered as an accompanying person (step S1103, YES), the process proceeds to step S1013.

Contrarily, if the management server 10 determines that the person included in the captured image is not a person registered as an accompanying person (step S1103, NO), the process proceeds to step S1106.

In step S1105, the management server 10 outputs a check instruction screen indicating the absence of an accompanying person to the operation terminal 70 and ends the process.

FIG. 32 is a diagram illustrating one example of a check instruction screen regarding an accompanying person displayed on the operation terminal 70. In the left side region in the screen, a captured image captured at a boarding gate is displayed. A person T in the captured image is a passenger on which face authentication has been performed. Further, in the right side region in the screen, boarding reservation information regarding the person T is displayed in a list form. This example represents that the accompanying person of the person T is "female/young child". As represented by the dashed line in the captured image, however, a child C registered as an accompanying person of the person T is not included in the captured image. Thus, a message instructing the staff member S to check an accompanying person ("Accompanying person information is registered for this passenger. Please check the accompanying person") is displayed in the lower side region in the screen.

In step S1106, the management server 10 outputs a check instruction screen indicating an unsuccessful matching of an accompanying person to the operation terminal 70 and ends the process.

FIG. 33 is a diagram illustrating one example of a check instruction screen of an accompanying person displayed on the operation terminal 70. In the left side region in the screen, a captured image captured at a boarding gate is displayed. The person T in the captured image is a passenger on which face authentication has been performed. Further, in the right side region in the screen, boarding reservation information regarding the person T is displayed in a list form. This example represents that the accompanying person of the person T is "male/young child". However, the child C included in the captured image is different from the registered accompanying person. Thus, a message instructing the staff member S to check an accompanying person ("This accompanying person is different from registered information. Please check the accompanying person") is displayed in the lower side region in the screen.

As described above, according to the present example embodiment, the management server 10 can analyze a captured image at a boarding gate and efficiently instruct the staff member S to perform a check operation regarding an accompanying person of a passenger. Specifically, the management server 10 acquires a target face image of a passenger from a captured image obtained by capturing the passenger at a boarding gate and specifies a registered face image which is the same as a target face image. When the accompanying person associated with the specified registered face image is not included in the captured image at the boarding gate, the management server 10 outputs information that suggests a check operation of an accompanying person.

Furthermore, when the accompanying person associated with the specified registered face image and another passenger included in another captured image together with the passenger are not the same, the management server 10 outputs information that suggests a check operation of an accompanying person.

Third Example Embodiment

In an information processing system 4 in the present example embodiment will be described below. Note that a reference common to the reference provided in the drawings in the first example embodiment represents the same object. Description of features common to the first example embodiment will be omitted, and different features will be described in detail.

Figure 34:
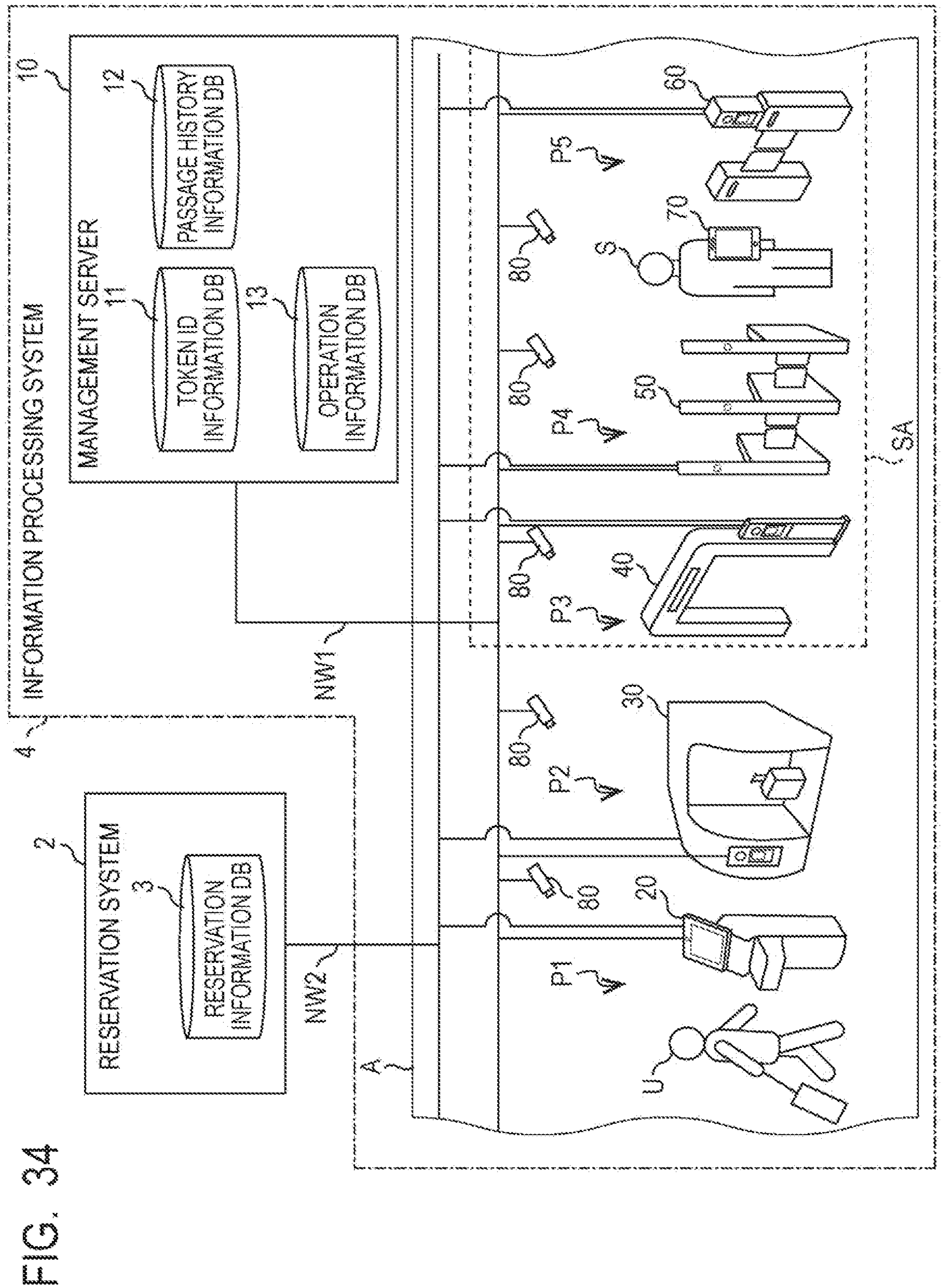
FIG. 34 is a block diagram illustrating an example of an overall configuration of an information processing system in a third example embodiment.

FIG. 34 is a block diagram illustrating an example of the overall configuration of the information processing system 4 in the present example embodiment. The information processing system 4 is different from the information processing system 1 of the first example embodiment in that a function of searching for the position of a designated passenger in an airport by using captured images of the cameras 80 arranged at various places such as the touch points P1 to P5, a lounge (not illustrated), a duty-free shop (not illustrated), a pathway, and the like in the airport is further provided.

[Searching for Designated Passenger in Airport]

Figure 35:
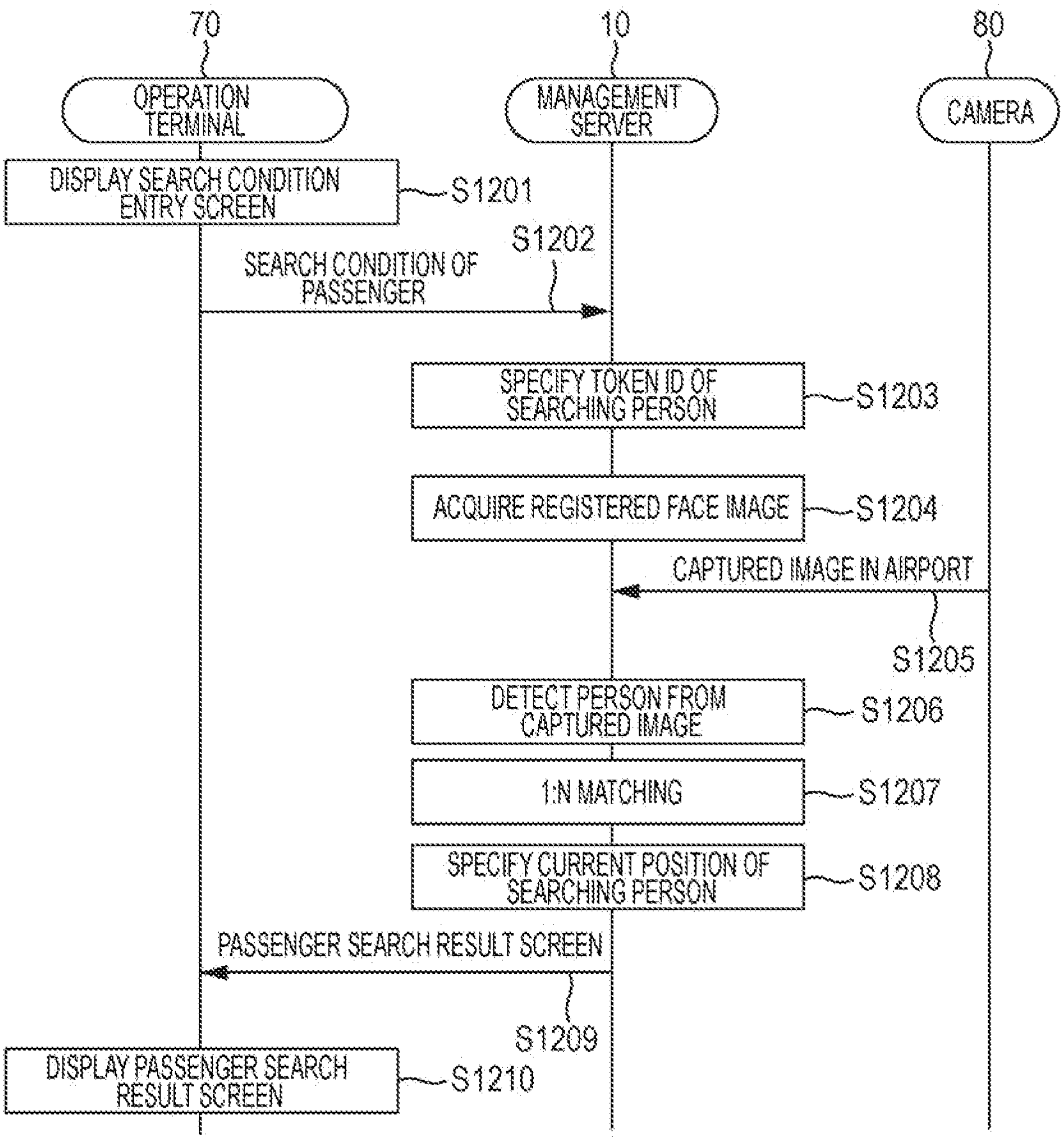
FIG. 35 is a sequence diagram illustrating one example of the process in the operation terminal, the management server, and the camera in the third example embodiment.

FIG. 35 is a sequence diagram illustrating one example of the process in the operation terminal 70, the management server 10, and the camera 80. This process is performed when the staff member S searches for the current position of a desired passenger out of passengers present in the airport. Note that the passenger to be searched for is a passenger for which a token ID has been issued.

First, the operation terminal 70 displays a search condition entry screen (step S1201) and then transmits, to the management server 10, a search condition input by the staff member S in the condition entry screen (step S1202). In the search condition entry screen, the same condition as that in the extraction condition entry screen illustrated in FIG. 28 may be input, or another condition may be further input. One example of a search condition may be a reservation number, an airline code, a seat class, a membership category, a name of a passenger, or the like. In the present example embodiment, such boarding reservation information is already stored as operation information in the operation information DB 13 at the time of issuance of a token ID. Thereby, an inquiry process of boarding reservation information to the reservation system 2 based on a reservation number can be omitted.

Next, in response to receiving a search condition from the operation terminal 70, the management server 10 specifies a token ID of a searching person associated with operation information matched to a search condition in the operation information DB 13 (step S1203).

Next, the management server 10 acquires a registered face image of a searching person from the token ID information DB 11 based on the specified token ID (step S1204).

Next, the management server 10 acquires captured images from the plurality of cameras 80 arranged in various places in the airport A in a distributed manner, respectively (step S1205).

Next, in response to acquiring captured images from the cameras 80, the management server 10 detects all the persons from respective captured images (step S1206).

Next, the management server 10 matches, at 1:N, a registered face image of the searching person with a plurality of face images detected from the captured image (step S1207).

Next, the management server 10 specifies the current position of the searching person based on the captured image including the person of the face image successfully matched with the registered face image of the searching person (step S1208) and then transmits a passenger search result screen including information on the current position of the searching person to the operation terminal 70 (step S1209).

The operation terminal 70 then displays the passenger search result screen received from the management server 10 on the display device 707 (step S1210).

Figure 36:
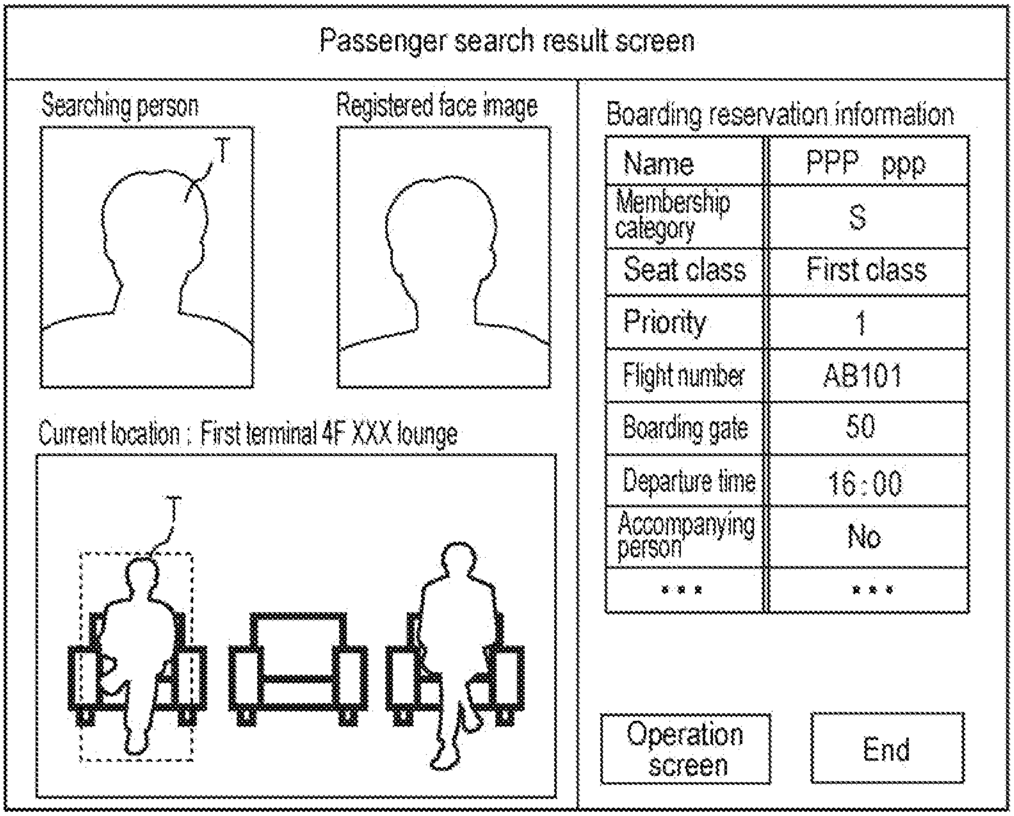
FIG. 36 is a diagram illustrating one example of a passenger search result screen displayed on the operation terminal in the third example embodiment.

FIG. 36 is a diagram illustrating one example of the passenger search result screen displayed on the operation terminal 70. In the left side region in the screen, a captured image of a place in which the searching person is found, a target face image of the searching person extracted from the captured image, and a registered face image successfully matched with the target face image are displayed. The dashed line section in the captured image is a detection region of the designated person T. Further, information on the current location of the searching person ("First Terminal, 4F, XXX lounge") is displayed above the captured image. In the right side region in the screen, boarding reservation information regarding the person T is displayed in a list form.

According to the present example embodiment, the management server 10 selects an image including a face image that is the same as a registered face image of a passenger to be searched for out of images captured by the plurality of cameras 80 (image capture device) arranged in the airport. The management server 10 then outputs position information of a passenger in the airport based on the selected image. That is, the management server 10 can easily search for a passenger in various places in the airport without being limited to the peripheral region of a boarding gate and notify the operation terminal 70 on the position information (current location) of the searched passenger. Thereby, information on a desired passenger can be shared by the staff members S.

Fourth Example Embodiment

Figure 37:
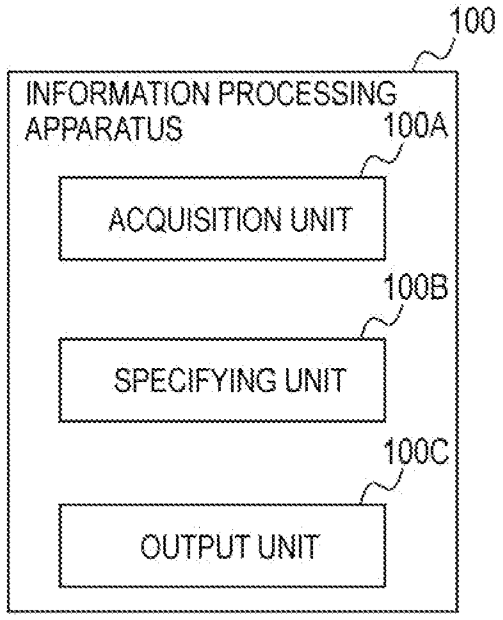
FIG. 37 is a block diagram illustrating an example of an overall configuration of an information processing apparatus in a fourth example embodiment.

FIG. 37 is a block diagram illustrating an example of the overall configuration of the information processing apparatus 100 in the present example embodiment. The information processing apparatus 100 has an acquisition unit 100A, a specifying unit 100B, and an output unit 100C. The acquisition unit 100A acquires biometric information of a passenger from a captured image obtained by capturing the passenger who is boarding on an airplane and has not yet passed through a boarding gate corresponding to the airplane. The specifying unit 100B specifies boarding reservation information regarding the boarding by using the biometric information acquired by the acquisition unit 100A. The output unit 100C outputs information used for supporting a procedure of the passenger at the boarding gate based on the boarding reservation information specified by the specifying unit 100B. According to the information processing apparatus 100 in the present example embodiment, it is possible to support a procedure of a passenger at a boarding gate.

MODIFIED EXAMPLE EMBODIMENTS

Although the present invention has been described above with reference to the example embodiments, the present invention is not limited to the example embodiments described above. Various modifications that may be appreciated by those skilled in the art can be made to the configuration and details of the present invention within the scope not departing from the spirit of the present invention. For example, it should be understood that an example embodiment in which a part of the configuration of any of the example embodiments is added to another example embodiment or an example embodiment in which a part of the configuration of any of the example embodiments is replaced with a part of the configuration of another example embodiment is also one of the example embodiments to which the present invention may be applied.

Further, the configuration of the present invention is applicable not only to an international flight but also to a domestic flight. In the case of a domestic flight, a 1:1 matching process between a passport face image and a captured face image in addition to an immigration procedure may be omitted. In such a case, for example, a captured face image at the time of purchasing a boarding ticket can be used as a registered biometric image. When a terminal such as a smartphone or a personal computer is used to purchase a boarding ticket or perform check-in online, if a face image captured by a terminal is registered, the user can also board on an airplane through face authentication at the airport A.

Although the check-in terminal 20 reads a passport face image from a passport and thereby issuance of a token ID is applied to the management server 10 in the first example embodiment described above, such issuance may be applied to the automatic baggage drop-off machine 30 or the security inspection apparatus 40 taking a case of an online check-in procedure into consideration. That is, the management server 10 acquires a passport face image and a target biometric image from any one of a terminal apparatus that performs the operation regarding the time of departure of the user U. Issuance of a token ID may be applied in a first performed procedure operation out of a series of procedure operations performed at the time of departure.

Further, in the first example embodiment described above, unlike the reservation information DB 3 of the reservation system 2, the operation information DB 13 of the management server 10 stores only some of the items of boarding reservation information (a reservation number and an airline code). Thus, a terminal apparatus (the check-in terminal 20 or the like) at each touch point inquires boarding reservation information based on a reservation number for the reservation system 2 at the time of performing a procedure. At the time of the first procedure, however, all pieces of boarding reservation information acquired from the reservation system 2 may be copied in the operation information DB 13 as operation information. In such a case, since the terminal apparatus at the subsequent touch point can acquire boarding reservation information from the management server 10 (operation information DB 13), the inquiry to the reservation system (airline system) 2 may be omitted, or the inquiry method may be changed if necessary.

For example, the process between the boarding gate apparatus 60, the management server 10, and the reservation system 2 can be performed in the following procedures at a boarding gate (touch point P5). First, the boarding gate apparatus 60 captures a face of a passenger and then transmits the face image to the management server 10. Next, the management server 10 performs face matching with a registered face image registered in the token ID information DB 11 and acquires the token ID corresponding to a registered face image of a successful matching. Next, the management server 10 transmits, to the boarding gate apparatus 60, boarding reservation information (boarding ticket data) acquired from the operation information DB 13 by using the token ID as a key. Next, the boarding gate apparatus 60 transmits the acquired boarding reservation information to the reservation system 2. Next, in response to receiving the boarding reservation information, the reservation system 2 matches the acquired boarding reservation information (boarding ticket data) with boarding reservation information stored in the reservation information DB 3 and, in response to determining whether or not to permit boarding of the passenger, transmits the determination result to the boarding gate apparatus 60. Accordingly, the boarding gate apparatus 60 can control opening of the gate 611 based on the determination result received from the reservation system 2.

Furthermore, although a case where information used for supporting a procedure of a passenger at a boarding gate is output to the operation terminal 70 has been described in the above first example embodiment, the terminal apparatus to which such information is output is not limited thereto. For example, such information may be output to a signage terminal arranged in a peripheral region of a boarding gate or on a pathway or to a mobile terminal carried by a passenger. When a contact address such as a mail address of a mobile terminal of a passenger is registered in a database (not illustrated), it is possible to output guide information indicating a correct waiting lane to the contact address when it is detected that the passenger is waiting in a wrong waiting lane.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:

an acquisition unit that acquires, from a captured image obtained by capturing a passenger who is boarding on an airplane and has not yet passed through a boarding gate corresponding to the airplane, biometric information of the passenger;

a specifying unit that specifies boarding reservation information regarding the boarding by using the acquired biometric information; and an output unit that outputs information used for supporting a procedure of the passenger at the boarding gate based on the specified boarding reservation information.

(Supplementary Note 2)

The information processing apparatus according to supplementary note 1 further comprising a control unit that issues a token ID corresponding to registered biometric information of the passenger for each passenger and associates the registered biometric information with the boarding reservation information in advance via the token ID, wherein the specifying unit specifies the boarding reservation information on the passenger based on the token ID corresponding to the registered biometric information successfully matched with the biometric information.

(Supplementary Note 3)

The information processing apparatus according to supplementary note 1 or 2, wherein the information includes priority in a procedure of the passenger performed at the boarding gate.

(Supplementary Note 4)

The information processing apparatus according to supplementary note 3, wherein the boarding reservation information includes a class of a seat in the airplane or a category of the passenger set by an airline company, and wherein the output unit outputs the priority based on the class or the category.

(Supplementary Note 5)

The information processing apparatus according to supplementary note 4, wherein the output unit outputs a waiting place prepared for boarding corresponding to the priority.

(Supplementary Note 6)

The information processing apparatus according to supplementary note 5, wherein when a person having different priority from the priority corresponding to the waiting place is included in passengers waiting in the waiting place, the output unit outputs the information that suggests guide to another waiting place corresponding to the priority of the person.

(Supplementary Note 7)

The information processing apparatus according to any one of supplementary notes 3 to 6, wherein the boarding reservation information further includes registered information regarding a predetermined accompanying person, and wherein the output unit outputs the priority based on whether or not the accompanying person is present.

(Supplementary Note 8)

The information processing apparatus according to supplementary note 7, wherein the acquisition unit acquires another biometric information of the passenger from another captured image obtained by capturing the passenger at the boarding gate, wherein the specifying unit specifies the boarding reservation information on the passenger by using the another biometric information, and wherein when the accompanying person recorded in the specified boarding reservation information is not included in the another captured image, the output unit outputs the information that suggests a check operation with respect to the accompanying person.

(Supplementary Note 9)

The information processing apparatus according to supplementary note 7, wherein the acquisition unit acquires another biometric information of the passenger from another captured image obtained by capturing the passenger at the boarding gate, wherein the specifying unit specifies the boarding reservation information on the passenger by using the another biometric information, and wherein when the accompanying person recorded in the specified boarding reservation information and a detected person detected together with the passenger in the another captured image are not the same, the output unit outputs the information that suggests a check operation with respect to the accompanying person.

(Supplementary Note 10)

The information processing apparatus according to any one of supplementary notes 1 to 9, wherein the specifying unit specifies each boarding reservation information on the passenger by using the biometric information of all passengers included in the captured image, and wherein the output unit outputs a list screen including the specified boarding reservation information.

(Supplementary Note 11)

The information processing apparatus according to any one of supplementary notes 1 to 10, wherein the specifying unit specifies the boarding reservation information by using the biometric information of the passenger specified on a screen displaying the captured image, and wherein the output unit outputs the specified boarding reservation information on the screen.

(Supplementary Note 12)

The information processing apparatus according to any one of supplementary notes 1 to 11 further comprising:

an input unit used for inputting an extraction condition of the passenger; and an extraction unit that extracts the passenger corresponding to the boarding reservation information satisfying the extraction condition out of passengers included in the captured image.

(Supplementary Note 13)

The information processing apparatus according to any one of supplementary notes 1 to 12 further comprising a selection unit that, out of images captured by an image capture device arranged in an airport, selects an image from which the biometric information of the passenger to be searched for is acquired, wherein the output unit outputs positional information on the passenger in the airport based on the selected image.

(Supplementary Note 14)

An information processing method comprising steps of:

acquiring, from a captured image obtained by capturing a passenger who is boarding on an airplane and has not yet passed through a boarding gate corresponding to the airplane, biometric information of the passenger;

specifying boarding reservation information regarding the boarding by using the acquired biometric information; and outputting information used for supporting a procedure of the passenger at the boarding gate based on the specified boarding reservation information.

(Supplementary Note 15)

A storage medium storing a program that causes a computer to perform:

acquiring, from a captured image obtained by capturing a passenger who is boarding on an airplane and has not yet passed through a boarding gate corresponding to the airplane, biometric information of the passenger;

specifying boarding reservation information regarding the boarding by using the acquired biometric information; and outputting information used for supporting a procedure of the passenger at the boarding gate based on the specified boarding reservation information.

REFERENCE SIGNS LIST

NW1, NW2 network
1, 4 information processing system
2 reservation system
3 reservation information DB
10 management server
11 token ID information DB
12 passage history information DB
13 operation information DB
20 check-in terminal
30 automatic baggage drop-off machine
40 security inspection apparatus
50 automated gate apparatus
60 boarding gate apparatus
70 operation terminal

80 camera

100 information processing apparatus

100A acquisition unit

100B specifying unit

100C output unit

The invention claimed is:

1. An information processing apparatus comprising:

a memory storing instructions; and a processor configured to execute the instructions to perform:

acquiring first biometrics information of a passenger from a captured image obtained by capturing the passenger;

acquiring second biometrics information included in a passport of the passenger;

acquiring boarding reservation information from an airline ticket information;

matching the first biometrics information acquired from the captured image and the second biometrics information acquired from the passport;

determining that the first biometrics information and the second biometrics information match;

based on determining that the first biometrics information and the second biometrics information match, issuing a token ID corresponding to the passenger, registering the token ID and the first biometrics information in database, and linking the token ID and the first biometrics information to the boarding reservation information;

displaying an entry screen configured to receive an input of a search condition for searching passengers;

searching boarding reservation information that matches the search condition and identifying the passenger, as a searching person, and the token ID, linked with the boarding reservation information, that matches the search condition;

detecting a current location of the passenger, as the searching person, by searching, from surveillance images captured by one or more of a plurality of cameras, for a registered face image of the passenger, the first biometrics information of the passenger comprising the registered face image of the passenger linked with the token ID; and displaying the current location of the passenger, as the searching person, detected from the surveillance images captured by the one or more of the plurality of cameras;

outputting and displaying, as a result of the searching, information indicating the passenger corresponding to the token ID linked with the boarding reservation information that matches the search condition, the information comprising the current location of the passenger, as the searching person, detected from the surveillance images captured by the one or more of the plurality of cameras, and wherein the token ID is a one-time token with an expiration date; and determining, during a validity period of the token ID, whether the passenger can board by collating the first biometrics information linked to the token ID and the captured image of the passenger at a boarding gate.

2. The information processing apparatus according to claim 1, wherein the processor is further configured to execute the instructions to perform:

displaying, based on determining that the first biometrics information and the second biometrics information match, the boarding reservation information of the passenger.

3. The information processing apparatus according to claim 1, wherein the processor is further configured to execute the instructions to perform:

receiving an extraction condition for extracting a desired passenger from passengers present around the boarding gate;

searching passenger reservation information that matches the extraction condition;

detecting passengers corresponding to the passenger reservation information from the captured image; and displaying a result of the detection.

4. An information processing method performed by a computer and comprising:

acquiring first biometrics information of a passenger from a captured image obtained by capturing the passenger;

acquiring second biometrics information included in a passport of the passenger; acquiring boarding reservation information from an airline ticket information;

matching the first biometrics information acquired from the captured image and the second biometrics information acquired from the passport;

determining that the first biometrics information and the second biometrics information match;

based on determining that the first biometrics information and the second biometrics information match, issuing a token ID corresponding to the passenger, registering the token ID and the first biometrics information in database, and linking the token ID and the first biometrics information to the boarding reservation information;

displaying an entry screen configured to receive an input of a search condition for searching passengers;

searching boarding reservation information that matches the search condition and identifying the passenger, as a searching person, and the token ID linked with the boarding reservation information that matches the search condition;

detecting a current location of the passenger, as the searching person, by searching, from surveillance images captured by one or more of a plurality of cameras, for a registered face image of the passenger, the first biometrics information of the passenger comprising the registered face image of the passenger linked with the token ID; and displaying the current location of the passenger, as the searching person, detected from the surveillance images captured by the one or more of the plurality of cameras;

outputting and displaying, as a result of the searching, information indicating the passenger corresponding to the token ID linked with the boarding reservation information that matches the search condition, the information comprising the current location of the passenger, as the searching person, detected from the surveillance images captured by the one or more of the plurality of cameras, and wherein the token ID is a one-time token with an expiration date; and determining, during a validity period of the token ID, whether the passenger can board by collating the first biometrics information linked to the token ID and the captured image of the passenger at a boarding gate.

5. The information processing method according to claim 4, wherein further comprising:

displaying, based on determining that the first biometrics information and the second biometrics information match, the boarding reservation information of the passenger.

6. The information processing method according to claim 4, further comprising:
receiving an extraction condition for extracting a desired passenger from passengers present around the boarding gate;
searching passengers that match the extraction condition;
detecting the passengers that match the extraction condition; and
displaying a result of the detection.

7. The information processing method according to claim 4, further comprising:
receiving an extraction condition for extracting a desired passenger from passengers present around the boarding gate;
searching passenger reservation information that matches the extraction condition;
detecting passengers corresponding to the passenger reservation information from the captured image; and
displaying a result of the detection.

8. A non-transitory storage medium storing a program executable by a computer to perform processing comprising:
acquiring first biometrics information of a passenger from a captured image obtained by capturing the passenger;
acquiring second biometrics information included in a passport of the passenger; acquiring boarding reservation information from an airline ticket information;
matching the first biometrics information acquired from the captured image and the second biometrics information acquired from the passport;
determining that the first biometrics information and the second biometrics information match;
based on determining that the first biometrics information and the second biometrics information match, issuing a token ID corresponding to the passenger, registering the token ID and the first biometrics information in database, and linking the token ID and the first biometrics information to the boarding reservation information;
displaying an entry screen configured to receive an input of a search condition for searching passengers;
searching boarding reservation information that matches the search condition and identifying the passenger, as a searching person, and the token ID linked with the boarding reservation information that matches the search condition;
detecting a current location of the passenger, as the searching person, by searching, from surveillance images captured by one or more of a plurality of cameras, for a registered face image of the passenger, the first biometrics information of the passenger comprising the registered face image of the passenger linked with the token ID; and
displaying the current location of the passenger, as the searching person, detected from the surveillance images captured by the one or more of the plurality of cameras;
outputting and displaying, as a result of the searching, information indicating the passenger corresponding to the token ID linked with the boarding reservation information that matches the search condition, the information comprising the current location of the passenger, as the searching person, detected from the surveillance images captured by the one or more of the plurality of cameras, and wherein the token ID is a one-time token with an expiration date; and
determining, during a validity period of the token ID, whether the passenger can board by collating the first biometrics information linked to the token ID and the captured image of the passenger at a boarding gate.

9. The non-transitory storage medium according to claim 8, wherein the processing further comprises:
displaying, based on determining that the first biometrics information and the second biometrics information match, the boarding reservation information of the passenger.

10. The non-transitory storage medium according to claim 8, wherein the processing further comprises:
receiving an extraction condition for extracting a desired passenger from passengers present around the boarding gate;
searching passengers that match the extraction condition from the captured image; detecting the passengers that match the extraction condition; and displaying a result of the detection.

11. The non-transitory storage medium according to claim 8, wherein the processing further comprises:
receiving an extraction condition for extracting a desired passenger from passengers present around the boarding gate;
searching passenger reservation information that matches the extraction condition;
detecting passengers corresponding to the passenger reservation information from the captured image; and
displaying a result of the detection.

* * * * *